(12) United States Patent
Wang et al.

(10) Patent No.: US 11,457,494 B2
(45) Date of Patent: Sep. 27, 2022

(54) COMMUNICATION METHOD, COMMUNICATIONS DEVICE, AND NETWORK DEVICE

(71) Applicant: Huawei Technologies Co., Ltd., Shenzhen (CN)

(72) Inventors: Yuchen Wang, Beijing (CN); Zhenzhen Cao, Beijing (CN); Haibo Xu, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 16/925,198

(22) Filed: Jul. 9, 2020

(65) Prior Publication Data

US 2020/0344835 A1    Oct. 29, 2020

Related U.S. Application Data

(63) Continuation of application No. PCT/CN2019/070876, filed on Jan. 8, 2019.

(30) Foreign Application Priority Data

Jan. 11, 2018  (CN) .......................... 201810027848.1

(51) Int. Cl.
*H04W 4/00*     (2018.01)
*H04W 76/19*    (2018.01)
(Continued)

(52) U.S. Cl.
CPC ......... *H04W 76/19* (2018.02); *H04W 72/042* (2013.01); *H04W 72/046* (2013.01); *H04W 72/0413* (2013.01); *H04W 76/28* (2018.02)

(58) Field of Classification Search
None
See application file for complete search history.

(56) References Cited

U.S. PATENT DOCUMENTS

2011/0038252 A1*  2/2011  Chung .................. H04W 74/04
                                                370/216
2016/0192433 A1   6/2016  Deenoo et al.
(Continued)

FOREIGN PATENT DOCUMENTS

CN   105191432 A   12/2015
CN   107567038 A    1/2018
(Continued)

OTHER PUBLICATIONS

Asustek, "Discussion on beam recovery request in NR", 3GPP TSG-RAN WG2 Meeting #100, R2-1712213, Nov. 27-Dec. 1, 2017, 4 pages, Reno, USA.
(Continued)

*Primary Examiner* — Clemence S Han
(74) *Attorney, Agent, or Firm* — Slater Matsil, LLP

(57) ABSTRACT

This application provides a communication method, a communications device, and a network device. When a beam failure occurs in a secondary cell of the communications device, the communications device sends a beam failure recovery request to the network device by using a PUCCH or a MAC CE, and determines an active state time of DRX based on a status of the beam failure recovery request. The communications device may also determine a stopping time of an uplink retransmission timer based on a running status of a configured grant timer, where the DRX of the communications device is in an active state when the uplink retransmission timer works; and monitors a PDCCH when the DRX of the communications device is in the active state.

17 Claims, 12 Drawing Sheets

(51) Int. Cl.
*H04W 76/28* (2018.01)
*H04W 72/04* (2009.01)

(56) References Cited

U.S. PATENT DOCUMENTS

| | | | |
|---|---|---|---|
| 2018/0270698 A1* | 9/2018 | Babaei | H04W 28/0278 |
| 2018/0270699 A1* | 9/2018 | Babaei | H04W 72/1284 |
| 2018/0270713 A1* | 9/2018 | Park | H04W 74/0833 |
| 2018/0270792 A1* | 9/2018 | Park | H04W 76/28 |
| 2018/0279229 A1* | 9/2018 | Dinan | H04W 52/367 |
| 2019/0053294 A1* | 2/2019 | Xia | H04B 7/088 |
| 2019/0082334 A1* | 3/2019 | Nagaraja | H04W 74/04 |
| 2019/0182870 A1* | 6/2019 | Shih | H04W 16/32 |
| 2019/0200396 A1* | 6/2019 | Agiwal | H04L 5/0035 |
| 2019/0215712 A1* | 7/2019 | Babaei | H04L 5/0092 |
| 2020/0205219 A1* | 6/2020 | Chen | H04L 5/0048 |
| 2020/0245395 A1* | 7/2020 | Zhang | H04L 5/0053 |
| 2021/0068162 A1* | 3/2021 | Agiwal | H04L 5/0023 |

FOREIGN PATENT DOCUMENTS

| | | |
|---|---|---|
| WO | 2017105151 A1 | 6/2017 |
| WO | 2017146535 A1 | 8/2017 |

OTHER PUBLICATIONS

Huawei et al, "Consideration on DRX with beam management", 3GPP TSG-RAN WG2#100, R2-1712562, Nov. 27-Dec. 1, 2017, 5 pages, Reno, Nevada, USA.

Huawei, "Summary of [99bis#41 ] [NR UP/MAC] Open issues on SPS and GF—Huawei", 3GPP TSG RAN WG2 Meeting 100, R2-1713173, Nov. 27-Dec. 1, 2017, 58 pages, Reno, United States.

* cited by examiner

COMMUNICATION METHOD, COMMUNICATIONS DEVICE, AND NETWORK DEVICE

CROSS-REFERENCE TO RELATED APPLICATIONS

This application is a continuation of International Application No. PCT/CN2019/070876, filed on Jan. 8, 2019, which claims priority to Chinese Patent Application No. 201810027848.1, filed on Jan. 11, 2018. The disclosures of the aforementioned applications are hereby incorporated by reference in their entireties.

TECHNICAL FIELD

This application relates to communications technologies, and in particular, to a communication method, a communications device, and a network device.

BACKGROUND

In a long term evolution (LTE) system, to reduce power consumption of a terminal device, a discontinuous reception (DRX) mechanism is introduced. The DRX mechanism indicates that when there is no data transmission, the terminal device turns off a receiver in a time period to reduce the power consumption.

In the LTE system, a basic DRX mechanism is to configure a DRX cycle for a terminal device in an RRC_CONNECTED state. The DRX cycle includes "On Duration" and "Opportunity for DRX". The "On Duration" is also referred to as an active period, and the "Opportunity for DRX" is also referred to as a sleep period. Within an "On Duration" time, the terminal device monitors a physical downlink control channel (PDCCH) and receives information on the PDCCH. Within an "Opportunity for DRX" time, the terminal device does not receive the information on the PDCCH, so that the power consumption is reduced. If the terminal device does not receive scheduling information on the PDCCH within the "On Duration" time, the terminal device enters the sleep period and stops receiving the information on the PDCCH. If the terminal device receives the scheduling information on the PDCCH within the "On Duration" time, the terminal device starts or re-starts a DRX-inactivity timer, and the terminal device monitors the PDCCH and remains in an active state within a timing time of the DRX-inactivity timer. The terminal device enters a sleep state when the DRX inactivity timer expires. However, the terminal device may need to receive a downlink data packet that is retransmitted, and therefore, the terminal device is still controlled by a DRX-retransmission timer after the terminal device enters the sleep state, and the terminal device maintains one DRX-retransmission timer for each hybrid automatic repeat request (HARQ) process. When the DRX inactivity timer of the terminal device expires, the terminal device can enter the sleep state only if DRX retransmission timers of all HARQ processes of the terminal device are stopped.

A DRX mechanism is also introduced in a 5G system, and the DRX mechanism in the 5G system is similar to the DRX mechanism in the LTE system. However, in an existing DRX mechanism, some messages in the 5G system cannot be received, for example, a slot format indicator (SFI), a pre-emption indicator (INT) PDCCH, a beam recovery request response, a retransmission indication and retransmission scheduling during grant-free transmission.

SUMMARY

This application provides a communication method, a communications device, and a network device, so that when the communications device is configured with DRX, the communications device accurately receives data.

According to a first aspect of this application, a communication method is provided, and includes: receiving, by a communications device, configuration information sent by a network device, where the configuration information includes a sending resource of the beam failure recovery request, and the sending resource is a physical uplink control channel PUCCH or a media access control control element MAC CE; when a beam failure occurs in a secondary cell of the communications device, sending, by the communications device, the beam failure recovery request to the network device by using the PUCCH or the MAC CE; and determining, by the communications device, an active state time of DRX based on a status of the beam failure recovery request. By using the method, it can be ensured that when power consumption of the communications device is reduced, the communications device accurately receives a response message of the beam failure recovery request.

In a possible implementation, the method further includes: monitoring, by the communications device, a PDCCH within the active state time of the DRX.

In a possible implementation, the configuration information includes a value of a response window timer, and the determining, by the communications device, an active state time of DRX based on a status of the beam failure recovery request includes: after the beam failure recovery request is sent, controlling, by the communications device, the response window timer to start, where a working time of the response window timer is the active state time of the DRX.

In a possible implementation, the configuration information includes indication information of a first time, the first time is a time for which the communications device delays, after sending the beam failure recovery request, starting the response window timer, and the determining, by the communications device, an active state time of DRX based on a status of the beam failure recovery request includes: after the beam failure recovery request is sent, controlling, by the communications device, the response window timer to start after a delay of the first time, where a working time of the response window timer is the active state time of the DRX.

The base station needs to process the beam failure recovery request process, and therefore, the communications device cannot receive the response message of the beam failure recovery request in the beam failure recovery request. In this manner, after sending the beam failure recovery request, the communications device starts the response window timer after the delay of the first time, so that it can be ensured that the communications device can accurately receive the response message of the beam failure recovery request, and the power consumption of the communications device is further reduced.

In a possible implementation, the method further includes: when receiving a first indication, controlling, by the communications device, the response window timer to stop.

In a possible implementation, the first time includes X symbols, and a value of X is greater than 0.

In a possible implementation, when the communications device sends the beam failure recovery request by using the PUCCH, the determining, by the communications device, an active state time of DRX based on a status of the beam failure recovery request includes: when the beam failure recovery request is suspended, determining, by the communications device, that a time in which the beam failure recovery request is in a suspended state is the active state time of the DRX.

According to a second aspect of this application, a communication method is provided, and includes: sending, by a network device, configuration information to a communications device, where the configuration information includes a sending resource of a beam failure recovery request and a value of a response window timer, and the sending resource is a physical uplink control channel PUCCH or a media access control control element MAC CE; receiving, by the network device, the beam failure recovery request based on the sending resource; and determining, by the network device, an active state time of discontinuous reception DRX of the communications device based on a receiving time of the beam failure recovery request and the value of the response window timer.

In a possible implementation, the base station sends a response message of the beam failure recovery request to the terminal device within the active state time of the DRX of the terminal device.

In a possible implementation, the configuration information further includes indication information of a first time, and the first time is a time for which the communications device delays, after sending the beam failure recovery request, starting the response window timer.

In a possible implementation, the first time includes X symbols, and a value of X is greater than 0.

According to a third aspect of this application, a communication method is provided, and includes: receiving, by a communications device, configuration information of a configured grant timer and configuration information of an uplink retransmission timer that are sent by a network device; determining, by the communications device, a stopping time of the uplink retransmission timer based on a running status of the configured grant timer, where discontinuous reception DRX of the communications device is in an active state when the uplink retransmission timer works; and monitoring, by the communications device, a physical downlink control channel PDCCH when the DRX of the communications device is in the active state. By using the method, accurate reception of a retransmission indication during uplink grant-free transmission can be ensured, and additional monitoring by the communications device can be reduced, so that power consumption of the communications device is reduced.

In a possible implementation, the determining, by the communications device, a stopping time of the uplink retransmission timer based on a running status of the configured grant timer includes: when the configured grant timer expires, if the uplink retransmission timer is working, controlling, by the communications device, the uplink retransmission timer to stop.

When the configured grant timer expires, the uplink retransmission timer is stopped in time, so that the power consumption of the terminal device can be further reduced.

In a possible implementation, the configured grant timer is started by the communications device after the first sending of first data.

In a possible implementation, the configured grant timer is started by the communications device when first data is sent.

In a possible implementation, the configured grant timer is started by the communications device after an uplink round trip time timer expires.

According to a fourth aspect of this application, a communication method is provided, and includes: sending, by a network device, configuration information of a configured grant timer and configuration information of an uplink retransmission timer to a communications device; and determining, by the network device based on the configuration information of the grant timer and the configuration information of the uplink retransmission timer, that discontinuous reception DRX of the communications device is in an active state.

In a possible implementation, the base station sends a retransmission indication during uplink grant-free transmission to the terminal device when the DRX of the terminal device is in the active state.

According to a fifth aspect of this application, a communication method is provided, and includes: receiving, by a communications device, configuration information that is of a configured grant timer and that is sent by a network device; when sending data, determining, by the communications device, an active state time of DRX based on a running status of the configured grant timer; and monitoring, by the communications device, a physical downlink control channel PDCCH when the DRX is in an active state.

By using the method, accurate reception of a retransmission indication during uplink grant-free transmission can be ensured, and additional monitoring by the communications device can be reduced, so that power consumption of the communications device is reduced.

In a possible implementation, the determining, by the communications device, an active state time of DRX based on a running status of the configured grant timer includes: controlling, by the communications device after the first sending of first data, the configured grant timer to start, where the DRX is in the active state when the configured grant timer works.

In a possible implementation, the method further includes: receiving, by the communications device, indication information that is of a first time and that is sent by the network device, where the first time is a time for which the communications device delays, after the first sending of first data, starting the configured grant timer, and the determining, by the communications device, an active state time of DRX based on a running status of the configured grant timer includes: controlling, by the communications device after the first sending of the first data, the configured grant timer to start after a delay of the first time, where the DRX is in the active state when the configured grant timer works.

In a possible implementation, the controlling, by the communications device after the first sending of the first data, the configured grant timer to start after a delay of the first time includes: controlling, by the communications device after the first sending of the first data, an uplink round trip time timer of a hybrid automatic repeat request HARQ process for processing the first data to start; and after the uplink round trip time timer expires, controlling, by the communications device, the configured grant timer to start.

The active state of the DRX is determined by combining the configured grant timer and an existing uplink round trip time timer, so that implementation is flexible, and a change performed on a protocol of the communications device is small.

In a possible implementation, the determining, by the communications device, an active state time of DRX based on a running status of the configured grant timer includes:

controlling, by the communications device after the first sending of the first data, an uplink round trip time timer and the configured grant timer of a hybrid automatic repeat request HARQ process for processing the first data to start, where after the uplink round trip time timer expires and when the configured grant timer works, the DRX is in the active state.

In a possible implementation, the determining, by the communications device, an active state time of DRX based on a running status of the configured grant timer includes: controlling, by the communications device when first data is sent, the configured grant timer to start, where the DRX is in the active state when the configured grant timer works.

In a possible implementation, the determining, by the communications device, an active state time of DRX based on a running status of the configured grant timer includes: controlling, by the communications device when first data is sent, the configured grant timer to start; and controlling, after the first sending of first data, an uplink round trip time timer of a hybrid automatic repeat request HARQ process for processing the first data to start, where after the uplink round trip time timer expires and when the configured grant timer works, the DRX is in the active state.

The active state of the DRX is determined by combining the configured grant timer and an existing uplink round trip time timer and uplink retransmission timer, so that the implementation is flexible, and a change performed on a protocol of the communications device is small.

In a possible implementation, the method further includes: when receiving a first indication, controlling, by the communications device, the configured grant timer to stop.

According to a sixth aspect of this application, a communication method is provided, and includes: sending, by a network device, configuration information of a configured grant timer to a communications device; receiving, by the network device, data sent by the communications device; and determining, by the network device, an active state time of discontinuous reception DRX of the communications device based on the data sent by the communications device and the configuration information of the configured grant timer.

In a possible implementation, the network device sends a retransmission indication during uplink grant-free transmission to the communications device when the DRX of the communications device is in an active state.

In a possible implementation, the method further includes: sending, by the network device, indication information of a first time to the communications device, where the first time is a time for which the communications device delays, after the first sending of first data, starting the configured grant timer.

In a possible implementation, the indication information of the first time is configuration information of an uplink round trip time timer.

In a possible implementation, the method further includes: sending, by the network device, the configuration information of the uplink round trip time timer to the communications device.

According to a seventh aspect of this application, a communication method is provided, and includes: receiving, by a communications device, a monitoring cycle of a first message sent by a network device, where the first message is a slot format indicator SFI message or a downlink pre-emption indicator message; and determining, by the communications device, an active state time of DRX based on the monitoring cycle and a slot index.

By using the method, when the communications device is configured with the DRX, the communications device can accurately receive the slot format indicator SFI message or the downlink pre-emption indicator message.

In a possible implementation, the method further includes: monitoring, by the communications device, a physical downlink control channel PDCCH within the active state time of the DRX.

In a possible implementation, the determining, by the communications device, an active state time of DRX based on the monitoring cycle and a slot index includes: when the slot index meets the following formula, determining, by the communications device, that a slot corresponding to the slot index is the active state time of the DRX: ns module monitoringPeriodicity=offset, where ns represents the slot index, module represents a modulo operation, monitoringPeriodicity represents the monitoring cycle, the monitoring cycle is in a slot unit, offset is a nonnegative integer, and offset is configured by the network device or preset.

In a possible implementation, when the first message is the SFI, the method further includes: receiving, by the communications device, indication information sent by the network device, where the indication information is used to indicate that the monitoring cycle includes a flexible slot or a flexible symbol; and the determining, by the communications device, an active state time of DRX based on the monitoring cycle and a slot index includes: when the slot index meets the following formula, and the indication information indicates that a slot in a next monitoring cycle includes a flexible slot or a flexible symbol, determining, by the communications device, that a slot corresponding to the slot index is the active state time of the DRX: ns module monitoringPeriodicity=offset, where ns represents the slot index, module represents a modulo operation, monitoringPeriodicity represents the monitoring cycle, the monitoring cycle is in a slot unit, offset is a nonnegative integer, and offset is configured by the network device or preset.

In the method, the communications device needs to monitor a PDCCH only in a specific slot, where the slot includes a flexible slot or a flexible symbol, so that power consumption of the terminal device is further reduced.

In a possible implementation, when the first message is the downlink pre-emption indicator message, the determining, by the communications device, an active state time of DRX based on the monitoring cycle and a slot index includes: when the slot index meets the following formula, and in a slot corresponding to the slot index, a media access control MAC entity of the communications device has at least one hybrid automatic repeat request HARQ process for downlink transmission, determining, by the communications device, that the slot corresponding to the slot index is the active state time of the DRX: ns module monitoringPeriodicity=offset, where ns represents the slot index, module represents a modulo operation, monitoringPeriodicity represents the monitoring cycle, the monitoring cycle is in a slot unit, offset is a positive integer, and offset is configured by the network device or preset.

In the method, the communications device needs to monitor a PDCCH only in a specific slot, where in the slot, a MAC entity of the communications device has at least one HARQ process for downlink transmission, so that power consumption of the terminal device is further reduced.

According to an eighth aspect of this application, a communication method is provided, and includes: sending, by a network device, a monitoring cycle of a first message to a communications device, where the first message is a slot format indicator SFI message or a downlink pre-emption indicator message; and determining, by the network device, an active state time of DRX of the communications device based on the monitoring cycle and a slot index.

In a possible implementation, the network device sends the first message to the communications device when the DRX of the communications device is in an active state.

In a possible implementation, the determining, by the network device, an active state time of DRX of the communications device based on the monitoring cycle and a slot index includes: when the slot index meets the following formula, determining, by the network device, that a slot corresponding to the slot index is the active state time of the DRX of the communications device: ns module monitoringPeriodicity=offset, where ns represents the slot index, module represents a modulo operation, monitoringPeriodicity represents the monitoring cycle, the monitoring cycle is in a slot unit, and offset is a nonnegative integer.

In a possible implementation, when the first message is the SFI, the method further includes: sending, by the network device, indication information to the communications device, where the indication information is used to indicate that the monitoring cycle includes a flexible slot or a flexible symbol; and the determining, by the network device, an active state time of DRX of the communications device based on the monitoring cycle and a slot index includes: when the slot index meets the following formula, and the indication information indicates that a slot in a next monitoring cycle includes a flexible slot or a flexible symbol, determining, by the network device, that a slot corresponding to the slot index is the active state time of the DRX of the communications device: ns module monitoringPeriodicity=offset, where ns represents the slot index, module represents a modulo operation, monitoringPeriodicity represents the monitoring cycle, the monitoring cycle is in a slot unit, and offset is a nonnegative integer.

In a possible implementation, when the first message is the downlink pre-emption indicator message, the method further includes: determining, by the network device, that a media access control MAC entity of the communications device has at least one hybrid automatic repeat request HARQ process for downlink transmission; and the determining, by the network device, an active state time of DRX of the communications device based on the monitoring cycle and a slot index includes: when the slot index meets the following formula, and in a slot corresponding to the slot index, the MAC entity of the communications device has at least one HARQ process for the downlink transmission, determining, by the network device, that the slot corresponding to the slot index is the active state time of the DRX of the communications device: ns module monitoringPeriodicity=offset, where ns represents the slot index, module represents a modulo operation, monitoringPeriodicity represents the monitoring cycle, the monitoring cycle is in a slot unit, and offset is a positive integer.

In a possible implementation, the network device sends an offset value to the communications device.

According to a ninth aspect of this application, a communication method is provided, and includes: receiving, by a communications device, indication information sent by a network device, where the indication information is used to indicate a retransmission manner used for downlink transmission, and the retransmission manner is a grant-based transmission or grant-free transmission manner; and controlling, by the communications device, running statuses of a downlink round trip time timer and a downlink retransmission timer based on the indication information.

By using the method, the network device indicates the retransmission manner used for the downlink transmission, so that the communications device is prevented from starting the downlink round trip time timer and the downlink retransmission timer when the grant-free transmission is used for the downlink transmission. Therefore, power consumption of the communications device is reduced and a resource waste is avoided.

In a possible implementation, the controlling, by the communications device, running statuses of a downlink round trip time timer and a downlink retransmission timer based on the indication information includes: when the indication information indicates that the retransmission manner used for the downlink transmission is the grant-based transmission manner, controlling, by the communications device after physical uplink control channel PUCCH transmission, the downlink round trip time timer to start; after the downlink round trip time timer expires, controlling, by the communications device, the downlink retransmission timer to start; and when the uplink retransmission timer runs, if the communications device receives grant-based retransmission scheduling, controlling, by the communications device, the uplink retransmission timer to stop.

In a possible implementation, the controlling, by the communications device, running statuses of a downlink round trip time timer and a downlink retransmission timer based on the indication information includes: when the indication information indicates that the retransmission manner used for the downlink transmission is the grant-free transmission manner, controlling, by the communications device after the physical uplink control channel PUCCH transmission, the downlink round trip time timer and the downlink retransmission timer not to start.

In a possible implementation, the downlink round trip time timer and the downlink retransmission timer are timers of a hybrid automatic repeat request HARQ process associated with downlink retransmitted data.

According to a tenth aspect of this application, a communication method is provided, and includes: sending, by a network device, indication information to a communications device, where the indication information is used to indicate a retransmission manner used for downlink transmission, and the retransmission manner is a grant-based transmission or grant-free transmission manner.

In a possible implementation, the network device sends retransmitted data to the communications device based on the retransmission manner used for the downlink transmission.

In a possible implementation, the method further includes: sending, by the network device, configuration information of a downlink round trip time timer and configuration information of a downlink retransmission timer to the communications device.

According to an eleventh aspect of this application, a communication method is provided, and includes: receiving, by a communications device, configuration information of a downlink round trip time timer and configuration information of a downlink retransmission timer that are sent by a network device; controlling, by the communications device after physical uplink control channel PUCCH transmission, the downlink round trip time timer to start; after the downlink round trip time timer expires, controlling, by the communications device, the downlink retransmission timer to start; and when the downlink retransmission timer runs, if the communications device receives downlink data for grant-free transmission, controlling, by the communications device, the downlink retransmission timer to stop.

By using the method, the communications device can accurately receive retransmitted data when receiving data in a downlink grant-free transmission manner.

In a possible implementation, the downlink data for the grant-free transmission received by the communications device is associated with a hybrid automatic repeat request HARQ process corresponding to the downlink retransmission timer.

In a possible implementation, the downlink data for the grant-free transmission is first data for the first sending.

According to a twelfth aspect of this application, a communication method is provided, and includes: sending, by a network device, configuration information of a downlink round trip time timer and configuration information of a downlink retransmission timer to a communications device.

In a possible implementation, when the downlink retransmission timer runs, the network device sends downlink data for grant-free transmission to the communications device based on the configuration information of the downlink round trip time timer and the configuration information of the downlink retransmission timer.

According to a thirteenth aspect of this application, a communications device is provided, and includes: a receiving module, configured to receive configuration information sent by a network device, where the configuration information includes a sending resource of the beam failure recovery request, and the sending resource is a physical uplink control channel PUCCH or a media access control control element MAC CE; a sending module, configured to: when a beam failure occurs in a secondary cell of the communications device, send the beam failure recovery request to the network device by using the PUCCH or the MAC CE; and a processing module, configured to determine an active state time of DRX based on a status of the beam failure recovery request.

In a possible implementation, the receiving module is further configured to monitor a physical downlink control channel PDCCH within the active state time of the DRX.

In a possible implementation, the configuration information further includes a value of a response window timer, and the processing module is specifically configured to: after the beam failure recovery request is sent, control the response window timer to start, where a working time of the response window timer is the active state time of the DRX.

In a possible implementation, the configuration information further includes indication information of a first time, the first time is a time for which the communications device delays, after sending the beam failure recovery request, starting the response window timer, and the processing module is specifically configured to: after the beam failure recovery request is sent, control the response window timer to start after a delay of the first time, where a working time of the response window timer is the active state time of the DRX.

In a possible implementation, the receiving module is further configured to receive a first indication; and the processing module is further configured to: when the receiving module receives the first indication, control the response window timer to stop.

In a possible implementation, the first time includes X symbols, and a value of X is greater than 0.

In a possible implementation, when the sending module sends the beam failure recovery request by using the PUCCH, the processing module is specifically configured to: when the beam failure recovery request is suspended, determine that a time in which the beam failure recovery request is in a suspended state is the active state time of the DRX.

According to a fourteenth aspect of this application, a network device is provided, and includes: a sending module, configured to send configuration information to a communications device, where the configuration information includes a sending resource of a beam failure recovery request and a value of a response window timer, and the sending resource is a physical uplink control channel PUCCH or a media access control control element MAC CE; a receiving module, configured to receive the beam failure recovery request based on the sending resource; and a processing module, configured to determine an active state time of discontinuous reception DRX of the communications device based on a receiving time of the beam failure recovery request and the value of the response window timer.

In a possible implementation, the configuration information further includes indication information of a first time, and the first time is a time for which the communications device delays, after sending the beam failure recovery request, starting the response window timer.

In a possible implementation, the first time includes X symbols, and a value of X is greater than 0.

According to a fifteenth aspect of this application, a communications device is provided, and includes: a receiving module, configured to receive configuration information of a configured grant timer and configuration information of an uplink retransmission timer that are sent by a network device; and a processing module, configured to determine a stopping time of the uplink retransmission timer based on a running status of the configured grant timer, where discontinuous reception DRX of the communications device is in an active state when the uplink retransmission timer works, where the receiving module is further configured to monitor a physical downlink control channel PDCCH when the DRX of the communications device is in the active state.

In a possible implementation, the processing module is specifically configured to: when the configured grant timer expires, if the uplink retransmission timer is working, control the uplink retransmission timer to stop.

In a possible implementation, the configured grant timer is started after the first sending of first data.

In a possible implementation, the configured grant timer is started when first data is sent.

In a possible implementation, the configured grant timer is started after an uplink round trip time timer expires.

According to a sixteenth aspect of this application, a network device is provided, and includes: a sending module, configured to send configuration information of a configured grant timer and configuration information of an uplink retransmission timer to a communications device; and a processing module, configured to determine, based on the configuration information of the grant timer and the configuration information of the uplink retransmission timer, that discontinuous reception DRX of the communications device is in an active state.

In a possible implementation, the processing module is further configured to: send a retransmission indication during uplink grant-free transmission to the terminal device when the DRX of the terminal device is in the active state.

According to a seventeenth aspect of this application, a communications device is provided, and includes: a receiving module, configured to receive configuration information that is of a configured grant timer and that is sent by a network device; and a processing module, configured to:

when the communications device sends data, determine an active state time of DRX based on a running status of the configured grant timer, where the receiving module is further configured to monitor a physical downlink control channel PDCCH when the DRX is in an active state.

In a possible implementation, the processing module is specifically configured to: control, after the first sending of first data, the configured grant timer to start, where the DRX is in the active state when the configured grant timer works.

In a possible implementation, the receiving module is further configured to receive indication information that is of a first time and that is sent by the network device, where the first time is a time for which the communications device delays, after the first sending of first data, starting the configured grant timer; and the processing module is specifically configured to: control, after the first sending of the first data, the configured grant timer to start after a delay of the first time, where the DRX is in the active state when the configured grant timer works.

In a possible implementation, that the processing module controls, after the first sending of the first data, the configured grant timer to start after a delay of the first time includes: controlling, after the first sending of the first data, an uplink round trip time timer of a hybrid automatic repeat request HARQ process for processing the first data to start; and controlling the configured grant timer to start after the uplink round trip time timer expires.

In a possible implementation, the processing module is specifically configured to: control, after the first sending of the first data, an uplink round trip time timer and the configured grant timer of a hybrid automatic repeat request HARQ process for processing the first data to start, where after the uplink round trip time timer expires and when the configured grant timer works, the DRX is in the active state.

In a possible implementation, the processing module is specifically configured to: control, when the first data is sent, the configured grant timer to start, where the DRX is in the active state when the configured grant timer works.

In a possible implementation, the processing module is specifically configured to: control, when the first data is sent, the configured grant timer to start; and control, after the first sending of the first data, the uplink round trip time timer of the hybrid automatic repeat request HARQ process for processing the first data to start, where after the uplink round trip time timer expires and when the configured grant timer works, the DRX is in the active state.

In a possible implementation, the processing module is further configured to: when the receiving module receives a first indication, control the configured grant timer to stop.

According to an eighteenth aspect of this application, a network device is provided, and includes: a sending module, configured to send configuration information of a configured grant timer to a communications device; a receiving module, configured to receive data sent by the communications device; and a processing module, configured to determine an active state time of discontinuous reception DRX of the communications device based on the data sent by the communications device and the configuration information of the configured grant timer.

In a possible implementation, the sending module is further configured to send a retransmission indication during uplink grant-free transmission to the communications device when the DRX of the communications device is in an active state.

In a possible implementation, the sending module is further configured to send indication information of a first time to the communications device, where the first time is a time for which the communications device delays, after the first sending of first data, starting the configured grant timer.

In a possible implementation, the indication information of the first time is configuration information of an uplink round trip time timer.

In a possible implementation, the sending module is further configured to: send the configuration information of the uplink round trip time timer to the communications device.

According to a nineteenth aspect of this application, a communications device is provided, and includes: a receiving module, configured to receive a monitoring cycle of a first message sent by a network device, where the first message is a slot format indicator SFI message or a downlink pre-emption indicator message; and a processing module, configured to determine an active state time of DRX based on the monitoring cycle and a slot index.

In a possible implementation, the receiving module is further configured to: monitor a physical downlink control channel PDCCH within the active state time of the DRX.

In a possible implementation, the processing module is specifically configured to: when the slot index meets the following formula, determine that a slot corresponding to the slot index is the active state time of the DRX: ns module monitoringPeriodicity=offset, where ns represents the slot index, module represents a modulo operation, monitoringPeriodicity represents the monitoring cycle, the monitoring cycle is in a slot unit, offset is a nonnegative integer, and offset is configured by the network device or preset.

In a possible implementation, when the first message is the SFI, the receiving module is further configured to: receive indication information sent by the network device, where the indication information is used to indicate that the monitoring cycle includes a flexible slot or a flexible symbol; and the processing module is specifically configured to: when the slot index meets the following formula, and the indication information indicates that a slot in a next monitoring cycle includes a flexible slot or a flexible symbol, determine that a slot corresponding to the slot index is the active state time of the DRX: ns module monitoringPeriodicity=offset, where ns represents the slot index, module represents a modulo operation, monitoringPeriodicity represents the monitoring cycle, the monitoring cycle is in a slot unit, offset is a nonnegative integer, and offset is configured by the network device or preset.

In a possible implementation, when the first message is the downlink pre-emption indicator message, the determining module is specifically configured to: when the slot index meets the following formula, and in a slot corresponding to the slot index, a media access control MAC entity of the communications device has at least one hybrid automatic repeat request HARQ process for downlink transmission, determine that the slot corresponding to the slot index is the active state time of the DRX: ns module monitoringPeriodicity=offset, where ns represents the slot index, module represents a modulo operation, monitoringPeriodicity represents the monitoring cycle, the monitoring cycle is in a slot unit, offset is a positive integer, and offset is configured by the network device or preset According to a twentieth aspect of this application, a network device is provided, and includes: a sending module, configured to send a monitoring cycle of a first message to a communications device, where the first message is a slot format indicator SFI message or a downlink pre-emption indicator message; and a processing module, configured to determine an active state time of DRX of the communications device based on the monitoring cycle and a slot index.

In a possible implementation, the sending module is further configured to send the first message to the communications device when the DRX of the communications device is in an active state.

In a possible implementation, the processing module is specifically configured to: when the slot index meets the following formula, determine that a slot corresponding to the slot index is an active state time of the DRX of the communications device: ns module monitoringPeriodicity=offset, where ns represents the slot index, module represents a modulo operation, monitoringPeriodicity represents the monitoring cycle, the monitoring cycle is in a slot unit, and offset is a nonnegative integer.

In a possible implementation, when the first message is the SFI, the sending module is further configured to: send indication information to the communications device, where the indication information is used to indicate that the monitoring cycle includes a flexible slot or a flexible symbol; and the processing module is specifically configured to: when the slot index meets the following formula, and the indication information indicates that a slot in a next monitoring cycle includes a flexible slot or a flexible symbol, determine that a slot corresponding to the slot index is the active state time of the DRX of the communications device: ns module monitoringPeriodicity=offset, where ns represents the slot index, module represents a modulo operation, monitoringPeriodicity represents the monitoring cycle, the monitoring cycle is in a slot unit, and offset is a nonnegative integer.

In a possible implementation, when the first message is the downlink pre-emption indicator message, the processing module is further configured to: determine that a media access control MAC entity of the communications device has at least one hybrid automatic repeat request HARQ process for downlink transmission; and the processing module is specifically configured to: when the slot index meets the following formula, and in a slot corresponding to the slot index, a MAC entity of the communications device has at least one HARQ process for downlink transmission, determine that the slot corresponding to the slot index is the active state time of the DRX of the communications device: ns module monitoringPeriodicity=offset, where ns represents the slot index, module represents a modulo operation, monitoringPeriodicity represents the monitoring cycle, the monitoring cycle is in a slot unit, and offset is a positive integer.

In a possible implementation, the network device sends an offset value to the communications device.

According to a twenty-first aspect of this application, a communications device is provided, and includes: a receiving module, configured to receive indication information sent by a network device, where the indication information is used to indicate a retransmission manner used for downlink transmission, and the retransmission manner is a grant-based transmission or grant-free transmission manner; and a processing module, configured to control running statuses of a downlink round trip time timer and a downlink retransmission timer based on the indication information.

In a possible implementation, the processing module is specifically configured to: when the indication information indicates that the retransmission manner used for the downlink transmission is the grant-based transmission manner, control, after physical uplink control channel PUCCH transmission, the downlink round trip time timer to start; after the downlink round trip time timer expires, control the downlink retransmission timer to start; and when the uplink retransmission timer runs, if grant-based retransmission scheduling is received, control the uplink retransmission timer to stop.

In a possible implementation, the processing module is specifically configured to: when the indication information indicates that the retransmission manner used for the downlink transmission is the grant-free transmission manner, control, after the physical uplink control channel PUCCH transmission, the downlink round trip time timer and the downlink retransmission timer not to start.

In a possible implementation, the downlink round trip time timer and the downlink retransmission timer are timers of a hybrid automatic repeat request HARQ process associated with downlink retransmitted data.

According to a twenty-second aspect of this application, a network device is provided, and includes: a sending module, configured to send indication information to a communications device, where the indication information is used to indicate a retransmission manner used for downlink transmission, and the retransmission manner is a grant-based transmission or grant-free transmission manner.

In a possible implementation, the sending module is further configured to send retransmitted data to the communications device based on the retransmission manner used for the downlink transmission.

In a possible implementation, the sending module is further configured to: send configuration information of a downlink round trip time timer and configuration information of a downlink retransmission timer to the communications device.

According to a twenty-third aspect of this application, a communications device is provided, and includes: a processing module, configured to control, after physical uplink control channel PUCCH transmission, a downlink round trip time timer to start, where the processing module is further configured to: after the downlink round trip time timer expires, control a downlink retransmission timer to start; and a receiving module, configured to receive downlink data for grant-free transmission, where the processing module is further configured to: when the downlink retransmission timer runs, if the receiving module receives the downlink data for the grant-free transmission, control the downlink retransmission timer to stop.

In a possible implementation, the downlink data for the grant-free transmission received by the communications device is associated with a hybrid automatic repeat request HARQ process corresponding to the downlink retransmission timer.

In a possible implementation, the downlink data for the grant-free transmission is first data for the first sending.

According to a twenty-fourth aspect of this application, a network device is provided, and includes: a sending module, configured to send configuration information of a downlink round trip time timer and configuration information of a downlink retransmission timer to a communications device.

In a possible implementation, when the downlink retransmission timer runs, the sending module is further configured to send downlink data for grant-free transmission to the communications device based on the configuration information of the downlink round trip time timer and the configuration information of the downlink retransmission timer.

According to a twenty-fifth aspect of this application, a communications device is provided, and includes: a processor, a memory, and a transceiver, where the memory is configured to store an instruction, the transceiver is configured to communicate with another device, and the processor is configured to execute the instruction stored in the memory, to enable the communications device to perform the communication method according to any aspect of the first aspect, the third aspect, the fifth aspect, the seventh aspect, the ninth aspect, and the eleventh aspect of this application.

According to a twenty-sixth aspect of this application, a network device is provided, and includes: a processor, a memory, and a transceiver, where the memory is configured to store an instruction, the transceiver is configured to communicate with another device, and the processor is configured to execute the instruction stored in the memory, to enable the network device to perform the communication method according to any aspect of the second aspect, the fourth aspect, the sixth aspect, the eighth aspect, the tenth aspect, and the twelfth aspect of this application.

According to a twenty-seventh aspect of this application, a computer-readable storage medium is provided and is applied to a communications device. The computer-readable storage medium stores an instruction, and when the instruction is executed by a computing apparatus, the communications device is enabled to perform the communication method according to any aspect of the first aspect, the third aspect, the fifth aspect, the seventh aspect, the ninth aspect, and the eleventh aspect of this application.

According to a twenty-eighth aspect of this application, a computer-readable storage medium is provided and is applied to a network device. The computer-readable storage medium stores an instruction, and when the instruction is executed by a computing apparatus, the communications device is enabled to perform the communication method according to any aspect of the second aspect, the fourth aspect, the sixth aspect, the eighth aspect, the tenth aspect, and the twelfth aspect of this application.

This application provides a communication method, a communications device, and a network device. When a beam failure occurs in a secondary cell of the communications device, the communications device sends a beam failure recovery request to the network device by using a PUCCH or a MAC CE, and determines an active state time of DRX based on a status of the beam failure recovery request. By using the method, it can be ensured that when power consumption of the communications device is reduced, the communications device accurately receives a response message of the beam failure recovery request. Alternatively, the communications device determines a stopping time of an uplink retransmission timer based on a running status of a configured grant timer, where DRX of the communications device is in an active state when the uplink retransmission timer works; and monitors a PDCCH when the DRX of the communications device is in the active state. By using the method, accurate reception of a retransmission indication during uplink grant-free transmission can be ensured, and additional monitoring by the communications device can be reduced, so that power consumption of the communications device is reduced

DETAILED DESCRIPTION OF ILLUSTRATIVE EMBODIMENTS

Figure 1:
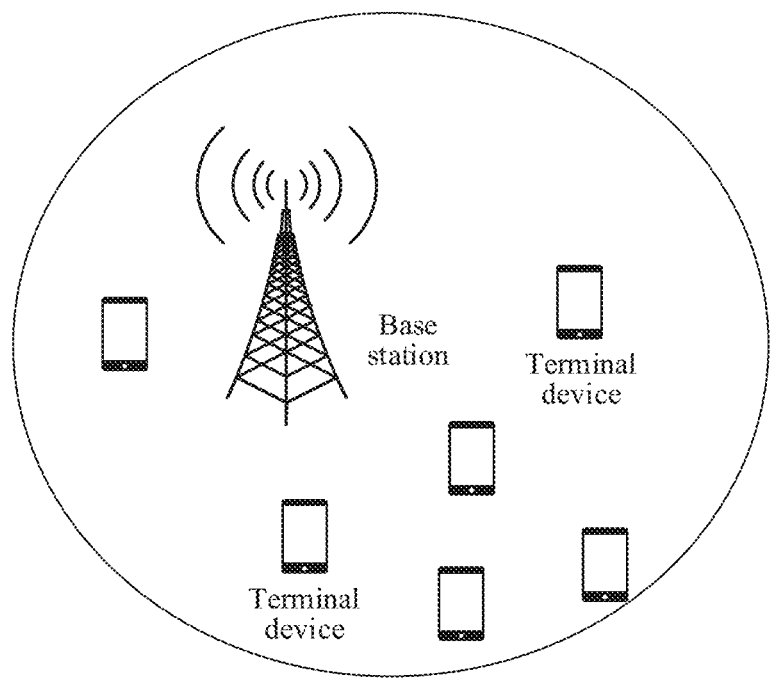
FIG. 1 is a schematic diagram of a network architecture to which an embodiment of this application is applicable.

This application provides a communication method. FIG. 1 is a schematic diagram of a network architecture to which an embodiment of this application is applicable. As shown in FIG. 1, the network architecture includes a base station and at least one terminal device. It should be clarified that the base station mentioned in this application may be a base transceiver station (BTS) in a global system of mobile communication (GSM) or a code division multiple access (CDMA) system, may be a NodeB (NB) in a wideband code division multiple access (WCDMA) system, may be an evolved NodeB (eNB), an access point (AP), or a relay station in a long term evolution (LTE) system, may be a base station (for example, a gNB or a transmission point (TRP)) in a 5th generation (5 Generation, 5G) system, or may be a wireless controller, a wearable device, a vehicle-mounted device, or the like in a scenario of a cloud radio access network (CRAN). This is not limited herein. The 5G system is also referred to as a new radio communications system, a new access technology (New Radio), or a next-generation mobile communications system.

The terminal device mentioned in this application may be user equipment (UE), an access terminal, a UE unit, a UE station, a mobile station, a mobile console, a remote station, a remote terminal, a mobile device, a UE terminal, a terminal, a wireless terminal device, a UE agent, a UE apparatus, or the like. The terminal device may further be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, a terminal in a future evolved public land mobile network (PLMN), or the like.

Figure 2:
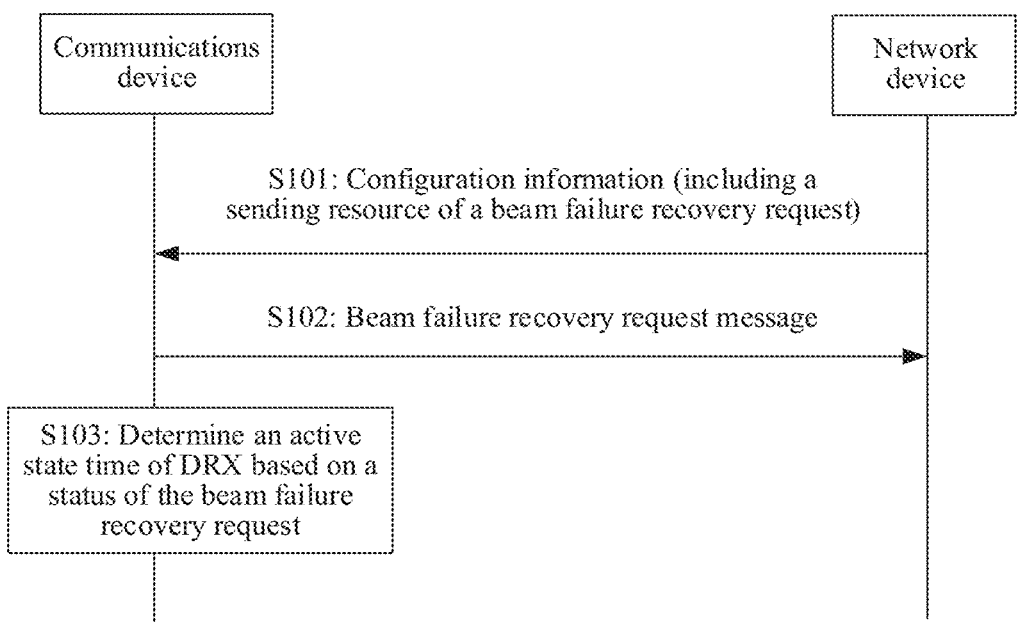
FIG. 2 is a flowchart of a communication method according to Embodiment 1 of this application.

Embodiment 1 of this application provides a communication method, to ensure that a communications device can accurately receive a response message of a beam failure recovery request. In this embodiment and the following embodiments, the communications device may be a terminal device, and a network device may be a base station. FIG. 2 is a flowchart of the communication method according to Embodiment 1 of this application. As shown in FIG. 2, the method provided in this embodiment includes the following steps.

Step S101: The network device sends configuration information to the communications device, where the configuration information includes a sending resource of a beam failure recovery request.

The sending resource is a physical uplink control channel (PUCCH) or a media access control (MAC) control element CE. The network device may send the configuration information to the communications device by using RRC signaling.

Step S102: When a beam failure occurs in a secondary cell of the communications device, the communications device sends the beam failure recovery request to the network device by using the PUCCH or the MAC CE.

Bandwidth may be increased for user equipment by using a carrier aggregation (CA) technology, and the communications device may simultaneously aggregate a plurality of cells during CA to perform signaling scheduling and service transmission. The plurality of cells aggregated by the communications device include a primary serving cell (referred to as a primary cell) and a secondary serving cell (referred to as a secondary cell). Usually, there is one primary cell, and there may be a plurality of secondary cells.

In both of the primary cell and the secondary cell, the communications device may send and receive data by using a beamforming technology. As the communications device moves or another communication condition changes, service quality of a beam used to serve the communications device also changes. The beam failure occurs in the communications device when the service quality of the beam used to serve the communications device cannot meet a requirement. When the beam failure occurs in the secondary cell of the communications device, a beam on which the beam failure occurs cannot be used for data transmission, and the communications device needs to request a new beam. In this case, the communications device sends, based on the received configuration information, the beam failure recovery request to the network device by using the PUCCH or the MAC CE. For example, the PUCCH is a PUCCH of the primary cell of the UE, or a PUCCH of another secondary cell of the UE.

Compared with the prior art in which the beam failure recovery request is sent in a random access preamble sequence manner, in this embodiment, the beam failure recovery request is sent by using the PUCCH and the MAC CE, to avoid reserving excessive time-frequency resources used to send a random access preamble sequence, thereby effectively avoiding a resource waste.

Step S103: The communications device determines an active state time of DRX based on a status of the beam failure recovery request.

The status of the beam failure recovery request includes a sent state and a suspended state. The DRX includes two states: an active state and an inactive state. The communications device configured with the DRX monitors a physical downlink control channel (PDCCH) within the active state time of the DRX, and the communications device does not monitor the PDCCH within an inactive state time of the DRX. Therefore, power consumption of the communications device can be reduced.

After the communications device sends the beam failure recovery request by using the PUCCH, the network device returns a response message to the communications device. The response message includes information about the new beam, and the communications device may transmit data by using the information about the new beam. Therefore, the communications device needs to accurately receive the response message of the beam failure recovery request. To ensure that the communications device can receive the response message of the beam failure recovery request, the communications device needs to monitor the PDCCH after sending the beam failure recovery request. Therefore, after sending the beam failure recovery request, the communications device needs to ensure that the DRX is in the active state. Specifically, by using the following several manners, it may be ensured that the DRX is in the active state after the communications device sends the beam failure recovery request.

In the first manner, the configuration information further includes a value of a response window timer. After the beam failure recovery request is sent, the communications device controls the response window timer to start. When the response window timer works, the DRX is in the active state, to be specific, a working time of the response window timer is the active state time of the DRX. That the response window timer works means that the response window timer is started. The value of the response window timer is timing duration.

After the response window timer is started, when receiving a first indication sent by the network device, the communications device controls the response window timer to stop, where the first indication may be a PDCCH processed by using a cell-radio network temporary identifier (Cell-RadioNetworkTemporaryIdentifier, C-RNTI).

Figure 3:
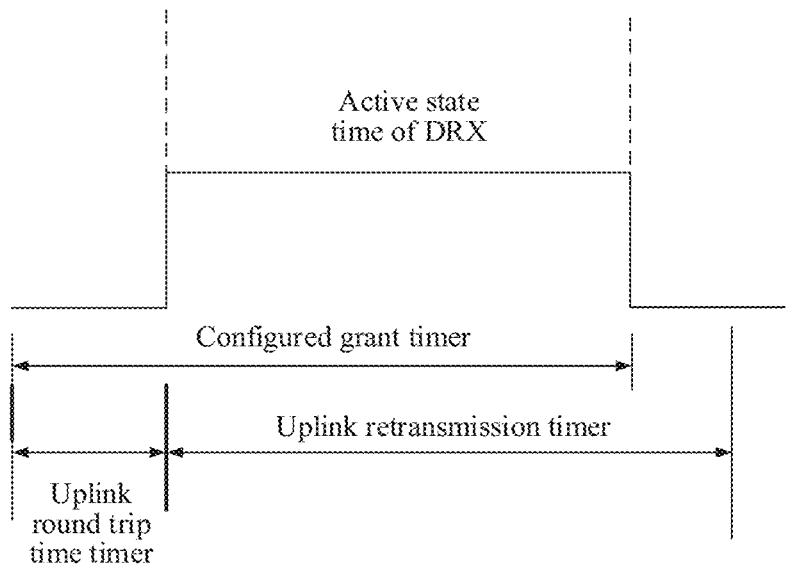
FIG. 3 is a schematic diagram of a status of DRX after a communications device sends a beam failure recovery request.

FIG. 3 is a schematic diagram of a status of DRX after the communications device sends the beam failure recovery request. As shown in FIG. 3, when the response window timer is started, the DRX is turned on, in other words, the DRX is in an active state. When the communications device receives the PDCCH processed by using the C-RNTI, the communications device controls the response window timer to stop, and the DRX is turned off when the response window timer is stopped. It can be learned from FIG. 3 that when the communications device receives the PDCCH processed by using the C-RNTI, the response window timer has not expired, to be specific, there is still a time period before the response window timer expires.

Correspondingly, the network device receives, based on the configured sending resource, the beam failure recovery request sent by the communications device, and determines the active state time of the DRX of the communications device based on a receiving time of the beam failure recovery request and the value of the response window timer. Optionally, the network device determines that a time from the receiving time of the beam failure recovery request to a time at which the response window timer is stopped is the active state time of the DRX. The network device may send the response message of the beam failure recovery request to the communications device within the active state time of the DRX of the communications device.

In this manner, after sending the beam failure recovery request, the communications device immediately starts the response window timer, and when the response window timer works, the DRX is in the active state, so that it is ensured that the communications device can accurately receive the response message of the beam failure recovery request. When the PDCCH processed by using the C-RNTI is received, the response window timer is immediately stopped, thereby reducing a quantity of monitoring times of the communications device.

In the second manner, the configuration information further includes indication information of a first time, and the first time is a time for which the communications device delays, after sending the beam failure recovery request, starting a response window timer. After the beam failure recovery request is sent, the communications device controls, based on the configuration information after a delay of the first time, the response window timer to start, and a working time of the response window timer is the active state time of the DRX.

A difference between the second manner and the first manner is that in the first manner, after sending the beam failure recovery request, the communications device immediately starts the response window timer, but in the second manner, after sending the beam failure recovery request, the communications device starts the response window timer after the delay of the first time. Optionally, the first time is specified by a protocol, and the configuration information does not need to carry the indication information of the first time.

Optionally, the first time includes X symbols, and a value of X is greater than 0. For example, the value of X is 2 or 3. The symbol is a time domain symbol, and for example, the symbol is an orthogonal frequency division multiplexing (OFDM) symbol.

After the response window timer is started, when receiving a first indication sent by the network device, the communications device controls the response window timer to stop, where the first indication may be a PDCCH processed by using a C-RNTI.

Figure 4:
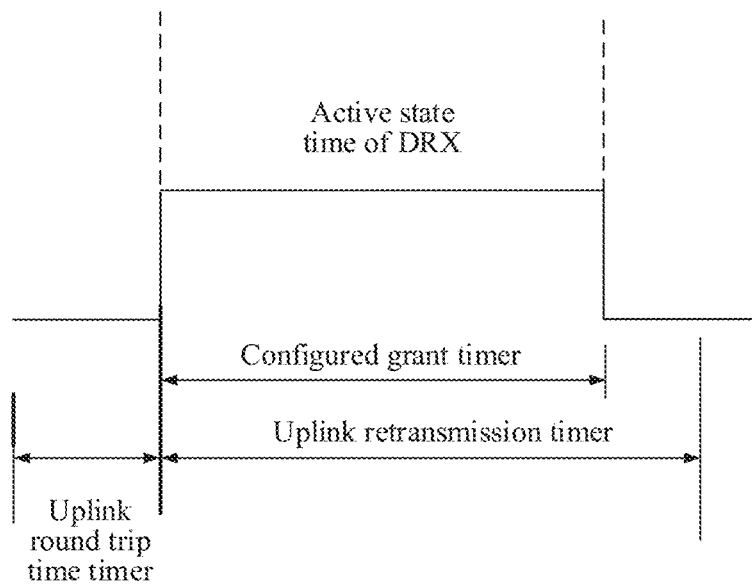
FIG. 4 is a schematic diagram of a status of DRX after a communications device sends a beam failure recovery request.

FIG. 4 is a schematic diagram of a status of DRX after the communications device sends the beam failure recovery request. As shown in FIG. 4, after sending the beam failure recovery request, the communications device starts the response window timer after a delay of the X symbols. When the response window timer is started, the DRX is turned on, in other words, the DRX is in the active state. When the communications device receives the PDCCH processed by using the C-RNRI, the communications device controls the response window timer to stop, and the DRX is turned off when the response window timer is stopped. It can be learned from FIG. 4 that when the communications device receives the PDCCH processed by using the C-RNTI, the response window timer has not expired, to be specific, there is still a time period before the response window timer expires.

Correspondingly, the network device receives, based on the configured sending resource, the beam failure recovery request sent by the communications device, and determines the active state time of the DRX of the communications device based on a receiving time of the beam failure recovery request, the first time, and a value of the response window timer. The network device may send the response message of the beam failure recovery request to the communications device within the active state time of the DRX of the communications device.

After the communications device sends the beam failure recovery request, the network device needs to process the beam failure recovery request, and the communications device cannot immediately receive the response message returned by the network device. Therefore, in this manner, after sending the beam failure recovery request, the communications device starts the response window timer after the delay of the X symbols, and when the response window timer works, the DRX is in the active state. In this manner, it can be ensured that the communications device can accurately receive the response message of the beam failure recovery request, and the power consumption of the communications device is further reduced.

In the third manner, when the beam failure recovery request is suspended, the communications device determines that a time in which the beam failure recovery request is in a suspended state is the active state time of the DRX.

When the beam failure recovery request is suspended, the communications device needs to send, when there is an uplink resource that can be used to send the beam failure recovery request, the beam failure recovery request by using the uplink resource. When the communications device sends the beam failure recovery request by using the PUCCH, if the beam failure recovery request is suspended, the DRX is supposed to be in the active state, and the communications device needs to monitor the PDCCH until the suspended state of the beam failure recovery request is canceled. For example, the PUCCH is a PUCCH of the primary cell of the communications device, or a PUCCH of another secondary cell of the communications device.

The suspended state of the beam failure recovery request may be canceled when the following condition is met: When receiving a first indication sent by the network device, the communications device cancels the suspended state of the beam failure recovery request, where the first indication may be a PDCCH processed by using a C-RNTI; when there is an opportunity for sending the beam failure recovery request but a quantity of sending times of the beam failure recovery request reaches a maximum quantity, the suspended state of the beam failure recovery request is canceled; or when there is an opportunity for sending the beam failure recovery request but a radio link failure occurs, the suspended state of the beam failure recovery request is canceled. The suspended state of the beam failure recovery request may be canceled when the foregoing condition is met, or may be canceled when another condition is met. This is not limited in this application.

In this manner, the DRX is in the active state when the beam failure recovery request is suspended, so that the communications device can monitor the PDCCH when the beam failure recovery request is suspended, and it is ensured that the communications device can accurately receive the response message of the beam failure recovery request, and cancel the suspended state of the beam failure recovery request in time after receiving the PDCCH processed by using the C-RNTI. Therefore, a quantity of monitoring times of the communications device is reduced, and the power consumption of the communications device is reduced.

In this embodiment, when the beam failure occurs in the secondary cell of the communications device, the communications device sends the beam failure recovery request to the network device by using the PUCCH or the MAC CE, and determines the active state time of the DRX based on the status of the beam failure recovery request, and the communications device monitors the PDCCH within the active state time of the DRX. Therefore, it can be ensured that when the power consumption of the communications device is reduced, the communications device accurately receives the response message of the beam failure recovery request.

Figure 5:
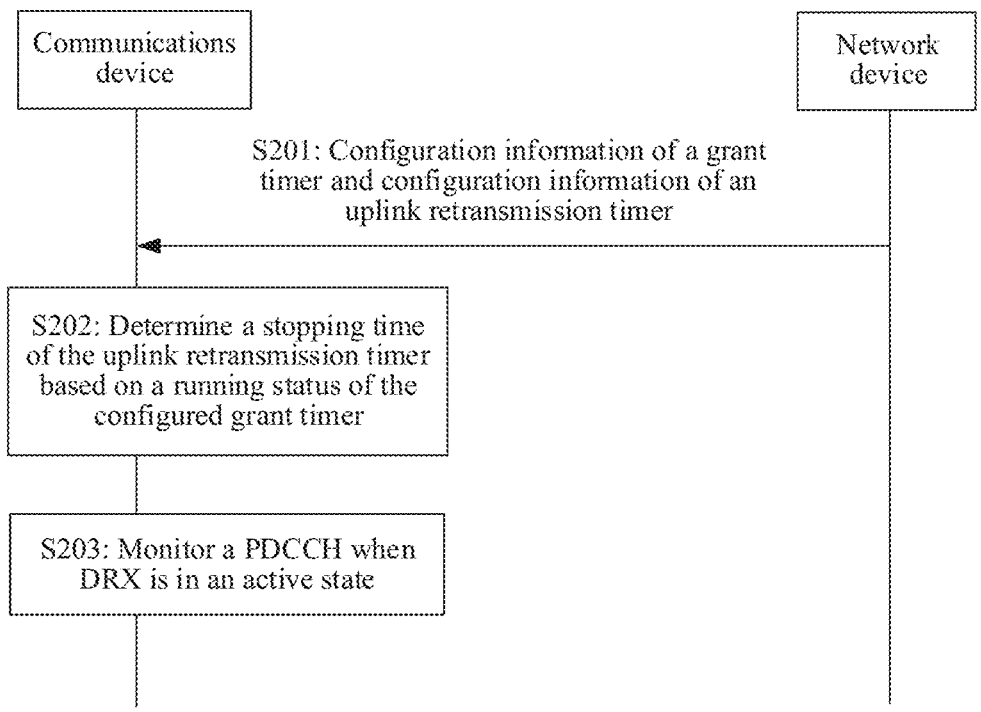
FIG. 5 is a flowchart of a communication method according to Embodiment 2 of this application.

FIG. 5 is a flowchart of a communication method according to Embodiment 2 of this application. By using the method in this embodiment, it can be ensured that a retransmission indication can be accurately received when a communications device sends data in an uplink grant-free transmission (Grant-free, or referred to as grantless, grant-less, UL transmission without grant, or the like) manner. As shown in FIG. 5, the method provided in this embodiment includes the following steps.

Step S201: A network device sends configuration information of a configured grant timer and configuration information of an uplink retransmission timer (drx-RetransmissionTimer UL) to the communications device.

The configured grant timer may alternatively have another name, for example, a first timer. A name of the configured grant timer is not limited in this application. The following uses the configured grant timer as an example for description. When the configured grant timer runs, the communications device cannot use a semi-persistent scheduling (SPS) resource or a resource of a type 1 to perform new transmission for an HARQ process corresponding to the configured grant timer. A parameter of the configured grant timer may be configured by using radio resource control (RRC) signaling.

The configuration information of the configured grant timer includes a value of the configured grant timer, and the configuration information of the uplink retransmission timer includes a value of the uplink retransmission timer.

Step S202: The communications device determines a stopping time of the uplink retransmission timer based on a running status of the configured grant timer, where DRX of the communications device is in an active state when the uplink retransmission timer works.

Step S203: The communications device monitors a PDCCH when the DRX of the communications device is in the active state.

The configured grant timer may stop when the communications device receives dynamic grant associated with the HARQ process corresponding to the configured grant timer.

Optionally, that the communications device determines a stopping time of the uplink retransmission timer based on a running status of the configured grant timer is specifically: When the configured grant timer expires, if the uplink retransmission timer is working, the communications device controls the uplink retransmission timer to stop.

In a manner, the configured grant timer is started by the communications device after the first sending of first data.

During grant-free transmission, the network device first allocates one or more grant-free transmission areas (or referred to as grant-free transmission resources) to the communications device, and the communications device directly sends uplink data (for example, uplink grant-free data) in the grant-free transmission areas without going through a process from service requesting to uplink grant by the network device. The grant-free transmission is contention-based transmission, and a plurality of communications devices may simultaneously preempt one transmission resource. Therefore, the communications device uses a K repeated transmission technology, to be specific, the communications device transmits a same transmission block (TB) in K consecutive transmission cycles, to improve a transmission success rate. In other words, the communications device repeatedly sends same data for K times, where K is an integer greater than 0.

In this manner, the communications device starts the configured grant timer after the first sending of the first data. The first sending of the first data indicates that the first data is sent for the first time. Optionally, the communications device starts an uplink round trip time timer (drx-HARQ Round Trip Time Timer Uplink, drx-HARQ-RTT-TimerUL) after the first sending of the first data, starts the uplink retransmission timer after the uplink round trip time timer expires, and stops the uplink retransmission timer after the configured grant timer expires. The configured grant timer, the uplink round trip time timer, and the uplink retransmission timer are all associated with a same HARQ process, and the HARQ process is an HARQ process for processing the first data.

In the prior art, one "drx-HARQ-RTT-TimerUL (uplink round trip time timer)" is defined for each HARQ process. After the first sending of uplink data of an uplink HARQ process, it may be assumed that the communications device receives, at least after symbols whose quantity is equal to a value of the drx-HARQ-RTT-TimerUL, downlink control information (DCI) that is sent by the network device and that indicates the transmission. The drx-HARQ-RTT-TimerUL is configured by the network device for the communications device. Therefore, the communications device does not need to monitor the PDCCH when the drx-HARQ-RTT-TimerUL is running. The communications device starts a drx-RetransmissionTimerUL (uplink retransmission timer) for the HARQ process when the drx-HARQ-RTT-TimerUL expires. When the drx-RetransmissionTimerUL runs, the communications device monitors a PDCCH used for HARQ retransmission. A length of time specified by the drx-RetransmissionTimerUL is related to a flexibility requirement of a network device scheduler. To achieve optimal battery consumption, after the drx-HARQ-RTT-TimerUL expires, the network device needs to immediately send the DCI that indicates the transmission. Correspondingly, the network device needs to reserve a radio resource for this. In this case, the time specified by the drx-RetransmissionTimer UL may be configured relatively short. The drx-RetransmissionTimerUL specifies a maximum quantity of slots for continuously monitoring the PDCCH after the communications device is expected to receive the DCI (sent after the drx-HARQ-RTT-TimerUL expires) that indicates the transmission. It should be noted that the uplink round trip time timer and the uplink retransmission timer that are used in this embodiment may use a configuration the same as that during grant-based transmission, or may be additionally configured by the network device.

Figure 6:
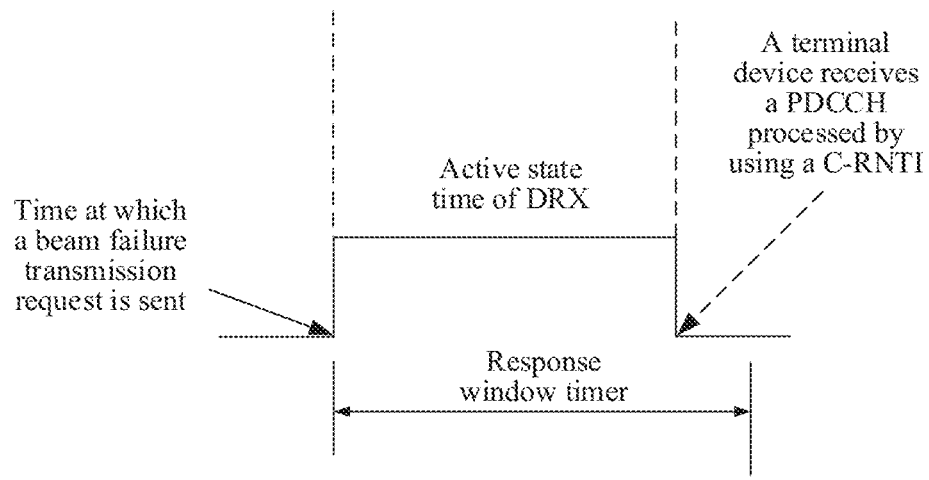
FIG. 6 is a schematic diagram of a status of DRX during uplink grant-free transmission.

FIG. 6 is a schematic diagram of a status of DRX during the uplink grant-free transmission. As shown in FIG. 6, the communications device starts the configured grant timer and the uplink round trip time timer of the HARQ process after the first sending of the first data, starts the uplink retransmission timer after the uplink round trip time timer expires, and stops the uplink retransmission timer after the configured grant timer expires. The DRX is in the active state when the uplink retransmission timer works.

In another manner, the configured grant timer is started by the communications device after the uplink round trip time timer expires. In this manner, the communications device controls, after the first sending of first data, the uplink round trip time timer to start, and after the uplink round trip time timer expires, controls the uplink retransmission timer and the configured grant timer to start. The DRX is in the active state when the uplink retransmission timer works.

Figure 7:
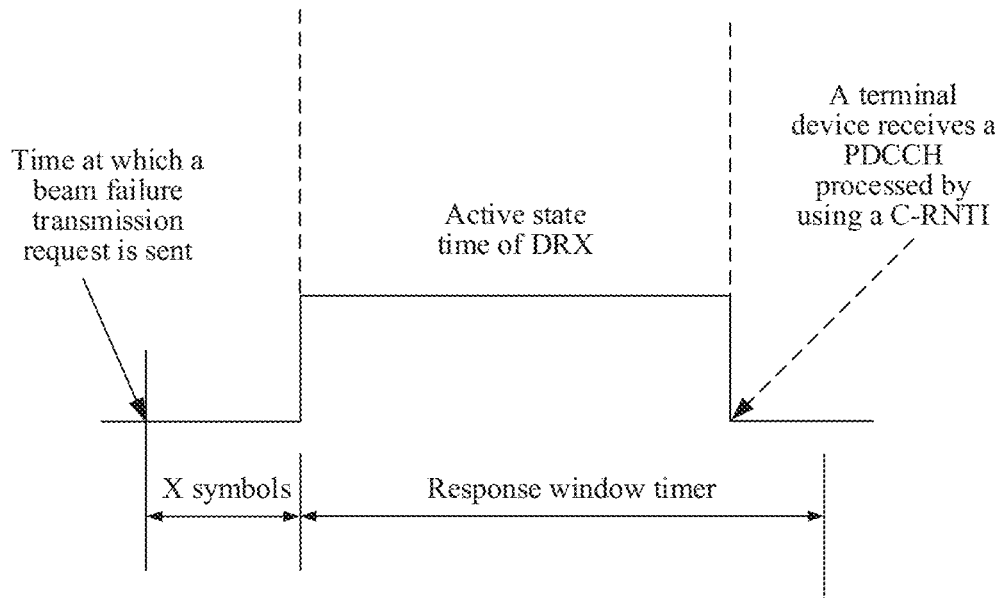
FIG. 7 is a schematic diagram of another status of DRX during uplink grant-free transmission.

FIG. 7 is a schematic diagram of another status of DRX during the uplink grant-free transmission. As shown in FIG. 7, the communications device starts the uplink round trip time timer of the HARQ process after the first sending of the first data, and starts the uplink retransmission timer and the configured grant timer of the HARQ process after the uplink round trip time timer expires. The DRX is in the active state when the uplink retransmission timer works. The uplink retransmission timer is stopped after the configured grant timer expires.

In another manner, the configured grant timer is started by the communications device when the first data is sent. A sending time of the first data is a time from a time at which the first sending of the first data is started to a time at which $K^{th}$ sending of the first data is finished. Therefore, the communications device may start the configured grant timer at any time between a starting moment of the first sending of the first data and a finishing moment of the $K^{th}$ sending of the first data. For example, the communications device starts the configured grant timer at the starting moment of the first sending of the first data, immediately starts the configured grant timer after the first sending of the first data, starts the configured grant timer at a starting moment of the second sending of the first data, or immediately starts the configured grant timer after the second sending of the first data.

Correspondingly, the network device determines, based on the configuration information of the grant timer and the configuration information of the uplink retransmission timer, that the DRX of the communications device is in the active state. The network device may send the retransmission indication during the uplink grant-free transmission to the communications device when the DRX of the communications device is in the active state.

It should be noted that, in this embodiment, the uplink round trip time timer, the uplink retransmission timer, and the configured grant timer all correspond to or are all associated with a same HARQ process.

In this embodiment, the communications device receives the configuration information of the configured grant timer and the configuration information of the uplink retransmission timer that are sent by the network device, and the communications device determines the stopping time of the uplink retransmission timer based on the running status of the configured grant timer. The DRX of the communications device is in the active state when the uplink retransmission timer works, and the communications device monitors the PDCCH when the DRX is in the active state. When the configured grant timer expires, the uplink retransmission timer is controlled to stop, so that accurate reception of the retransmission indication during the uplink grant-free transmission can be ensured, and additional monitoring by the communications device can be reduced. Therefore, power consumption of the communications device can be reduced.

Figure 8:
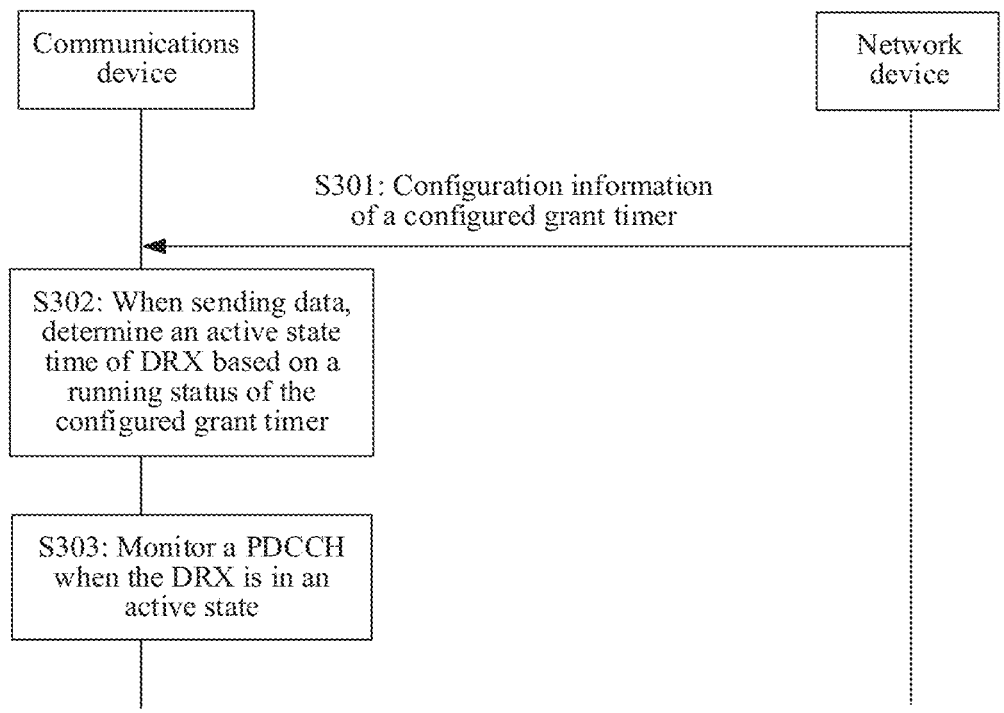
FIG. 8 is a flowchart of a communication method according to Embodiment 3 of this application.

FIG. 8 is a flowchart of a communication method according to Embodiment 3 of this application. By using the method in this embodiment, it can be ensured that a retransmission indication can be accurately received when a communications device sends data in an uplink grant-free transmission manner. As shown in FIG. 8, the method provided in this embodiment includes the following steps.

Step S301: A network device sends configuration information of a configured grant timer to the communications device.

Step S302: When sending data, the communications device determines an active state time of DRX based on a running status of the configured grant timer.

The data may be first data for the first sending.

Step S303: The communications device monitors a PDCCH when the DRX is in an active state.

Correspondingly, the network device determines the active state time of the DRX of the communications device based on the data sent by the communications device and the configuration information of the configured grant timer. The network device sends the retransmission indication during uplink grant-free transmission to the communications device when the DRX of the communications device is in the active state.

In the first manner, the communications device controls, after the first sending of the first data, the configured grant timer to start, and the DRX is in the active state when the configured grant timer works.

Figure 9:
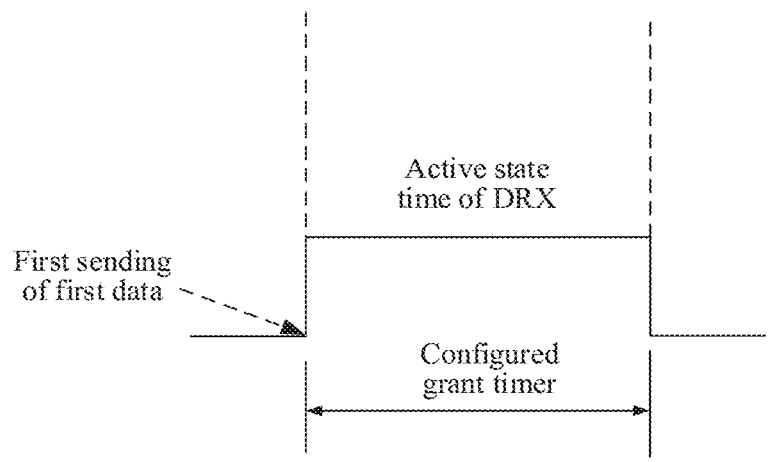
FIG. 9 is a schematic diagram of still another status of DRX during uplink grant-free transmission.

FIG. 9 is a schematic diagram of still another status of DRX during the uplink grant-free transmission. As shown in FIG. 9, the communications device immediately starts the configured grant timer after the first sending of the first data. When the configured grant timer is started, the DRX is turned on, in other words, the DRX is in the active state. The communications device monitors the PDCCH when the DRX is in the active state.

In this manner, the DRX is turned on after the first sending of the first data, and the communications device monitors the PDCCH within the active time of the DRX, so that it is ensured that the communications device can receive the retransmission indication during the uplink grant-free transmission.

In the second manner, the communications device receives indication information that is of a first time and that is sent by the network device, where the first time is a time for which the communications device delays, after the first sending of the first data, starting the configured grant timer, and the communications device controls, after the first sending of the first data, the configured grant timer to start after a delay of the first time, where the DRX is in the active state when the configured grant timer works. Alternatively, the first time may be preset by the communications device.

For example, the communications device controls, after the first sending of the first data, an uplink round trip time timer of an HARQ process for processing the first data to start, and after the uplink round trip time timer expires, controls the configured grant timer to start. In other words, the first time is implemented by using a timer, and the first time is a timing time of the uplink round trip time timer.

Figure 10:
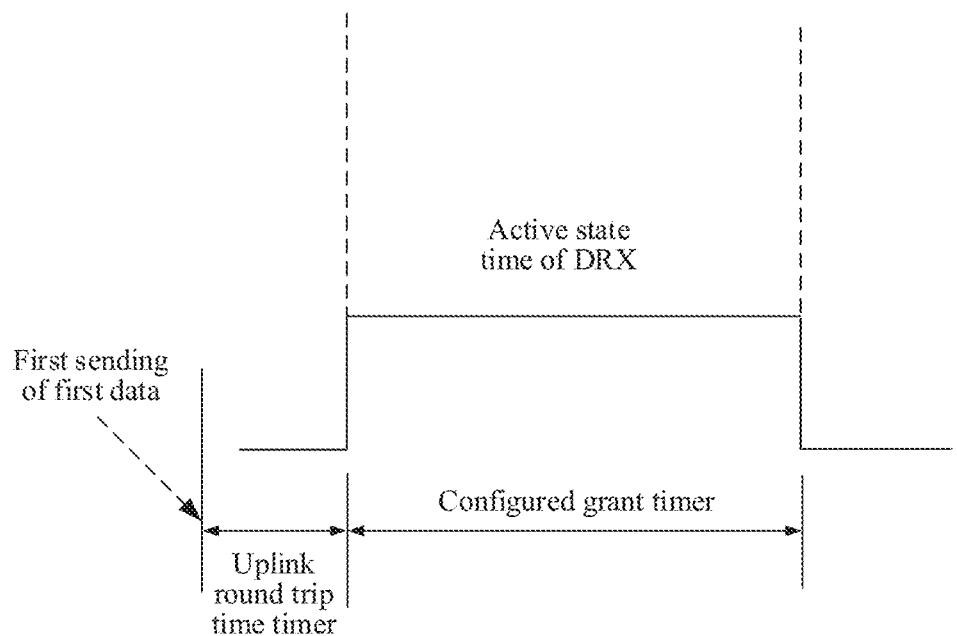
FIG. 10 is a schematic diagram of yet another status of DRX during uplink grant-free transmission.

FIG. 10 is a schematic diagram of yet another status of DRX during the uplink grant-free transmission. As shown in FIG. 10, the communications device immediately starts the uplink round trip time timer of the HARQ process after the first sending of the first data, and starts the configured grant timer after the uplink round trip time timer expires. When the configured grant timer is started, the DRX is turned on, in other words, the DRX is in the active state, and the communications device monitors the PDCCH when the DRX is in the active state.

In this manner, after the first sending of the first data, the DRX is turned on after the delay of the first time, and the communications device monitors the PDCCH within the active time of the DRX, so that it is ensured that the communications device can receive the retransmission indication during the uplink grant-free transmission. In addition, by delaying turning on the DRX for the first time, power consumption of the communications device can be further reduced.

In the third manner, the communications device controls, after the first sending of the first data, an uplink round trip time timer and the configured grant timer of an HARQ process for processing the first data to start, and after the uplink round trip time timer expires and when the configured grant timer works, the DRX is in the active state.

Figure 11:
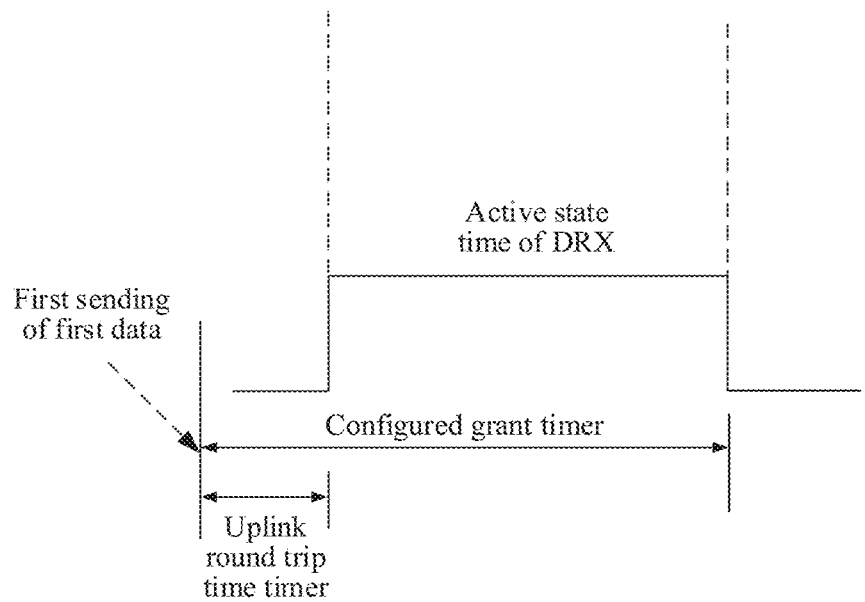
FIG. 11 is a schematic diagram of still yet another status of DRX during uplink grant-free transmission.

FIG. 11 is a schematic diagram of still yet another status of DRX during the uplink grant-free transmission. As shown in FIG. 11, the communications device starts the uplink round trip time timer and the configured grant timer of the HARQ process after the first sending of the first data. After the uplink round trip time timer expires, and when the configured grant timer works, the DRX is turned on, and the communications device monitors the PDCCH when the DRX is in the active state.

In this manner, after the first sending of the first data, the DRX is turned on after a delay of a time (a timing time of the uplink round trip time timer), and the communications device monitors the PDCCH within the active time of the DRX, so that it is ensured that the communications device can receive the retransmission indication during the uplink grant-free transmission. In addition, by delaying turning on the DRX for the time, power consumption of the communications device can be further reduced.

In the fourth manner, the communications device controls, when the first data is sent, the configured grant timer to start, and the DRX is in the active state when the configured grant timer works.

It should be noted that, in this embodiment, an uplink round trip time timer, the uplink retransmission timer, and the configured grant timer all correspond to or are associated with a same HARQ process. In addition, the uplink round trip time timer and the uplink retransmission timer that are used in this embodiment may use a configuration the same as that during grant-based transmission, or may be additionally configured by the network device.

In this embodiment, the communications device receives the configuration information that is of the configured grant timer and that is sent by the network device. After the first sending of the first data, the communications device determines the active state time of the DRX based on the running status of the configured grant timer. The communications device monitors the PDCCH when the DRX is in the active state. By controlling the active state of the DRX based on the running status of the configured grant timer, accurate reception of the retransmission indication during the uplink grant-free transmission can be ensured, and additional monitoring by the communications device can be reduced. Therefore, the power consumption of the communications device is reduced.

Figure 12:
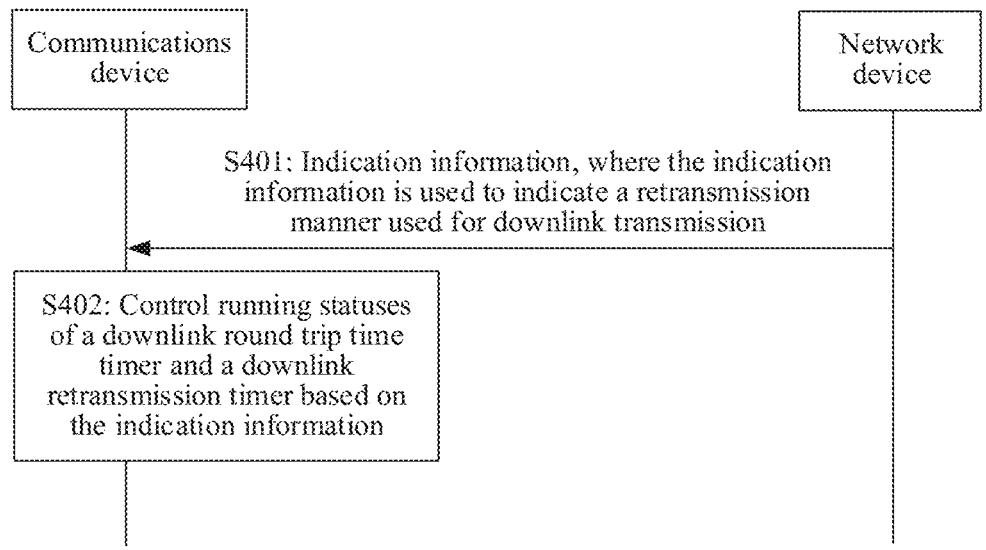
FIG. 12 is a flowchart of a communication method according to Embodiment 4 of this application.

FIG. 12 is a flowchart of a communication method according to Embodiment 4 of this application. By using the method in this embodiment, it can be ensured that a retransmission indication can be accurately received when a communications device receives data in a downlink grant-free transmission manner. As shown in FIG. 12, the method provided in this embodiment includes the following steps.

Step S401: A network device sends indication information to the communications device, where the indication information is used to indicate a retransmission manner used for downlink transmission, and the retransmission manner is a grant-based transmission or grant-free transmission manner.

Optionally, the network device may send the indication information by using RRC signaling or DCI. The indication information may be carried by using one bit. For example, if a value of the bit is 1, it indicates that the retransmission manner is the grant-based transmission manner, and if the value of the bit is 0, it indicates that the retransmission manner is the grant-free transmission manner.

Correspondingly, the network device sends retransmitted data to the communications device in the retransmission manner used for the downlink transmission.

Step S402: The communications device controls running statuses of a downlink round trip time timer and a downlink retransmission timer based on the indication information.

The downlink round trip time timer and the downlink retransmission timer are timers of an HARQ process associated with the downlink retransmitted data.

Figure 13:
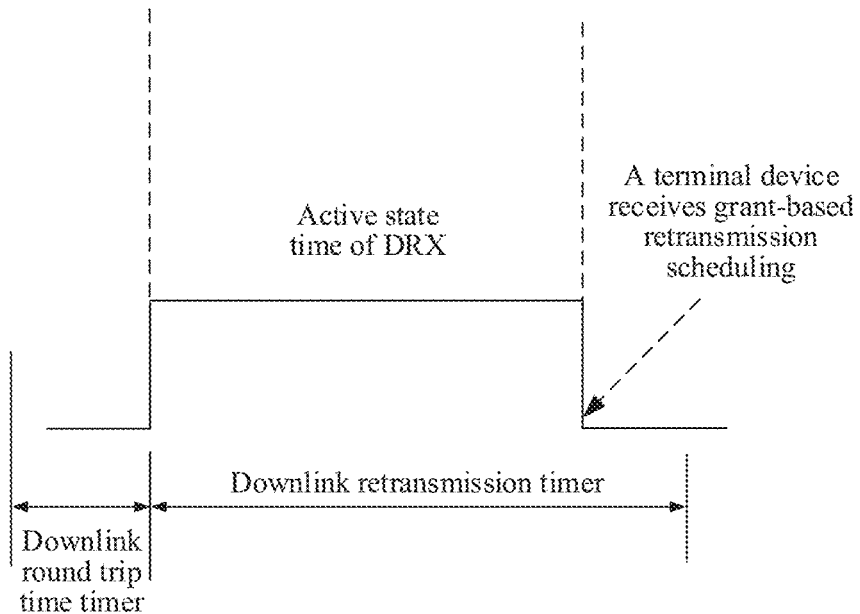
FIG. 13 is a schematic diagram of a status of DRX when a retransmission manner is a grant-based transmission manner.

When the indication information indicates that the retransmission manner used for the downlink transmission is the grant-based transmission manner, FIG. 13 is a schematic diagram of a status of DRX when the retransmission manner is the grant-based transmission manner. As shown in FIG. 13, the communications device controls, after PUCCH transmission, the downlink round trip time timer to start, after the downlink round trip time timer expires, controls the downlink retransmission timer to start. The DRX is in an active state when the downlink retransmission timer works, and the communications device monitors a PDCCH when the DRX is in the active state.

When the downlink retransmission timer runs, if the communications device receives grant-based retransmission scheduling, the communications device controls the downlink retransmission timer to stop, and the grant-based retransmission scheduling is sent by the network device. The communications device stops the downlink retransmission timer when receiving the grant-based retransmission scheduling, to avoid unnecessary monitoring, and further reduce power consumption of the communications device.

In this embodiment, when the indication information indicates that the retransmission manner used for the downlink transmission is the grant-free transmission manner, the communications device controls, after the PUCCH transmission, the downlink round trip time timer and the downlink retransmission timer not to start.

During grant-free transmission, the communications device does not need to receive scheduling from the network device, and the communications device performs retransmission by using a pre-configured grant-free transmission resource. Therefore, the communications device does not need to monitor the PDCCH. When the retransmission manner used for the downlink transmission is the grant-free transmission manner, if the communications device starts the downlink round trip time timer and the downlink retransmission timer, a waste of the power consumption of the communications device is caused.

It should be noted that, in this embodiment, both of the downlink round trip time timer and the downlink retransmission timer correspond to or are associated with a same HARQ process.

In the prior art, the communications device does not know whether the grant-free transmission or grant-based transmission is used for the downlink transmission, and the communications device controls, after the PUCCH transmission, the downlink round trip time timer and the downlink retransmission timer to start. When the retransmission manner used for the downlink transmission is the grant-free transmission manner, the waste of the power consumption of the communications device is caused. In this embodiment, the network device indicates the retransmission manner used for the downlink transmission, so that the communications device is prevented from starting the downlink round trip time timer and the downlink retransmission timer when the grant-free transmission is used for the downlink transmission. Therefore, the power consumption of the communications device is reduced and a resource waste is avoided. It should be noted that the uplink round trip time timer and the uplink retransmission timer that are used in this embodiment may use a configuration the same as that during the grant-based transmission, or may be additionally configured by the network device.

Figure 14:
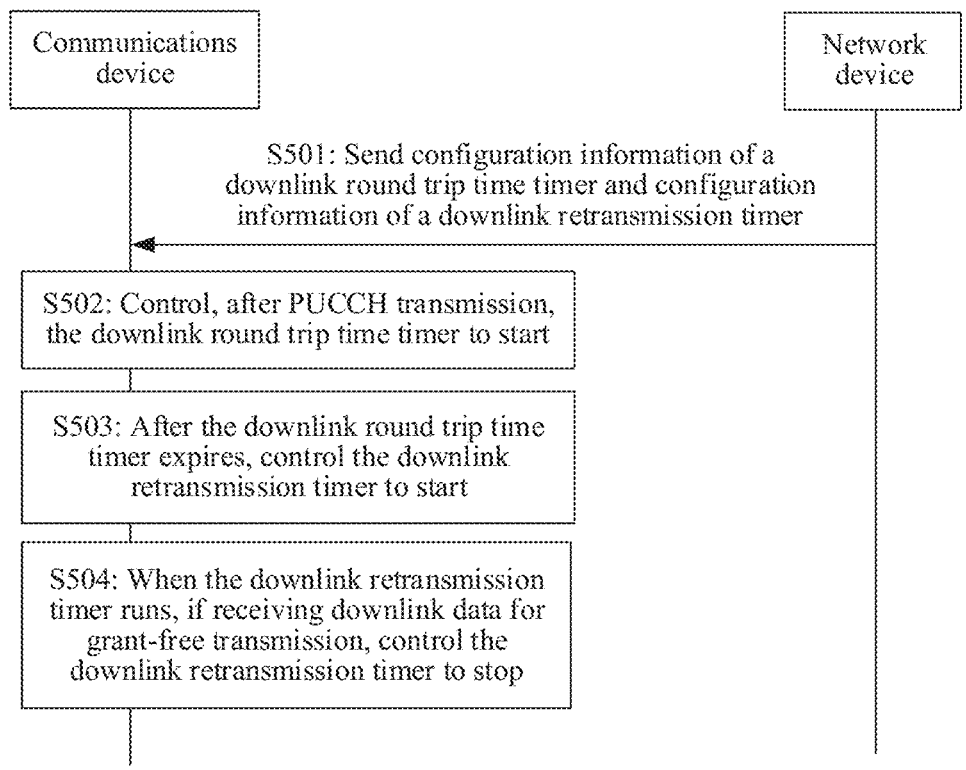
FIG. 14 is a flowchart of a communication method according to Embodiment 5 of this application.

FIG. 14 is a flowchart of a communication method according to Embodiment 5 of this application. By using the method in this embodiment, it can be ensured that retransmitted data can be accurately received when a communications device receives data in a downlink grant-free transmission manner. As shown in FIG. 14, the method provided in this embodiment includes the following steps.

Step S501: A network device sends configuration information of a downlink round trip time timer and configuration information of a downlink retransmission timer to the communications device.

The configuration information of the downlink round trip time timer includes a value of the downlink round trip time timer, and the configuration information of the downlink retransmission timer includes a value of the downlink retransmission timer.

Step S502: The communications device controls, after PUCCH transmission, the downlink round trip time timer to start.

Step S503: After the downlink round trip time timer expires, the communications device controls the downlink retransmission timer to start.

DRX is in an active state when the downlink retransmission timer works, and the communications device monitors a PDCCH when the DRX is in the active state. Correspondingly, when the downlink retransmission timer runs, the network device sends downlink data for grant-free transmission to the communications device based on the configuration information of the downlink round trip time timer and the configuration information of the downlink retransmission timer.

Step S504: When the downlink retransmission timer runs, if the communications device receives the downlink data for the grant-free transmission, the communications device controls the downlink retransmission timer to stop.

The downlink data for the grant-free transmission received by the communications device is associated with an HARQ process corresponding to the downlink retransmission timer. During the grant-free transmission, the network device uses a K times repeated transmission technology. Therefore, the downlink data during the grant-free transmission may be downlink data for $X^{th}$ sending, where a value of X ranges from 1 to K, and K is an integer greater than 0.

Figure 15:
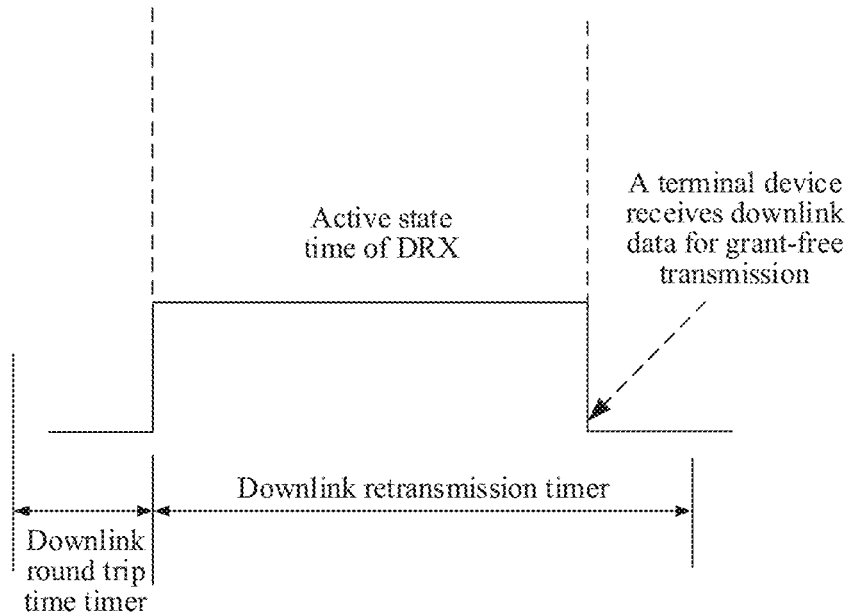
FIG. 15 is a schematic diagram of a status of DRX during grant-based downlink transmission.

FIG. 15 is a schematic diagram of a status of DRX during grant-based downlink transmission. As shown in FIG. 15, the communications device controls, after the PUCCH transmission, the downlink round trip time timer to start, and after the downlink round trip time timer expires, controls the downlink retransmission timer to start. The DRX is in the active state when the downlink retransmission timer works, and the communications device monitors the PDCCH when the DRX is in the active state, to receive downlink retransmitted data. When the downlink retransmission timer runs, if the communications device receives the downlink data for the grant-free transmission, the communications device controls the downlink retransmission timer to stop, to avoid unnecessary monitoring, and further reduce power consumption of the communications device. It should be noted that the downlink round trip time timer and the downlink retransmission timer that are used in this embodiment may use a configuration the same as that of grant-based transmission, or may be additionally configured by the network device. In addition, in this embodiment, both of the downlink round trip time timer and the downlink retransmission timer correspond to or are associated with a same HARQ process.

In this embodiment, the communications device controls, after the PUCCH transmission, the downlink round trip time timer to start, and after the downlink round trip time timer expires, controls the downlink retransmission timer to start. The DRX is in an active state when the downlink retransmission timer works, and the communications device monitors the PDCCH when the DRX is in the active state, so that the communications device can accurately receive retransmitted data when receiving data in a downlink grant-free transmission manner. In addition, when the downlink retransmission timer runs, if the communications device receives the downlink data for the grant-free transmission, the communications device controls the downlink retransmission timer to stop, to further reduce the power consumption of the communications device.

Figure 16:
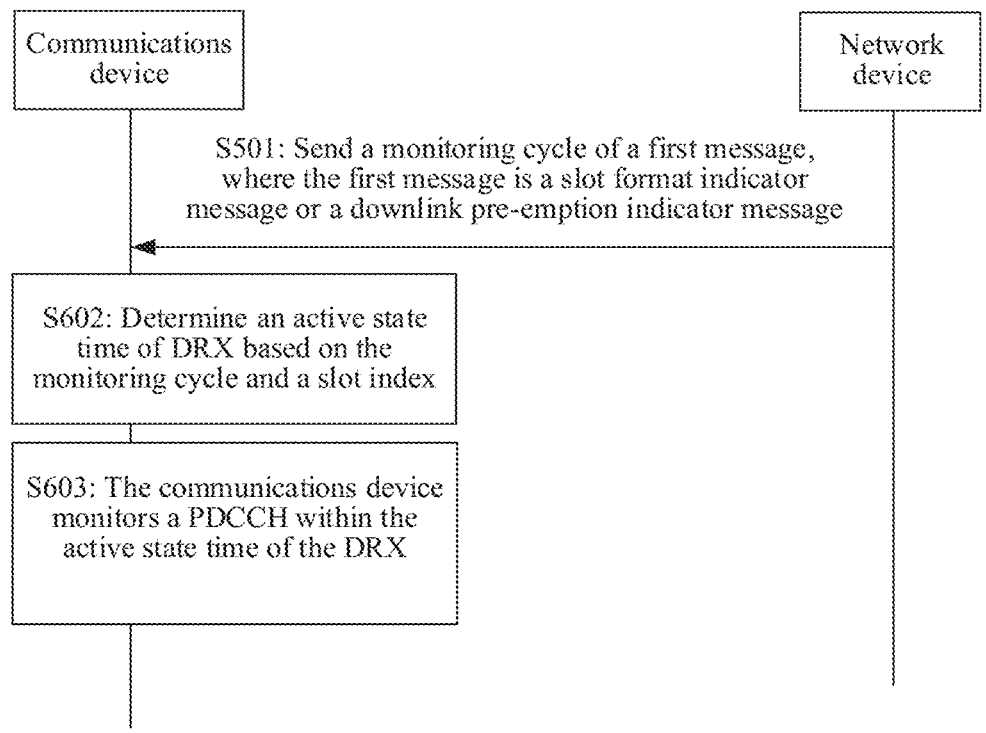
FIG. 16 is a flowchart of a communication method according to Embodiment 6 of this application.

FIG. 16 is a flowchart of a communication method according to Embodiment 6 of this application. As shown in FIG. 16, the method provided in this embodiment includes the following steps.

Step S601: A network device sends a monitoring cycle of a first message to a communications device, where the first message is a slot format indicator (SFI) message or a downlink pre-emption indicator message.

The monitoring cycle may be configured by using RRC signaling, or the monitoring cycle may alternatively be preset, and the monitoring cycle is in a slot unit. Both of the SFI and the downlink pre-emption indicator are sent cyclically. The SFI is used to indicate that a slot is an uplink slot, a downlink slot, or a flexible (or unknown) slot. The SFI is further used to indicate that a symbol included in the slot is an uplink symbol, a downlink symbol, or a flexible symbol. The uplink slot is used for uplink transmission, and the downlink slot is used for downlink transmission. The uplink symbol is used for the uplink transmission, and the downlink symbol is used for the downlink transmission. The flexible slot is a special slot, to be specific, the flexible slot may be used for the uplink transmission or the downlink transmission. Similarly, the flexible symbol may also be used for the downlink transmission or the uplink transmission.

A 5G system supports an enhanced mobile broadband (eMBB) service, an ultra reliable and low latency communications (URLLC) service, and a massive machine type communications (mMTC) service. Different services have different requirements on a communications system. When the URLLC service is used as an example, due to abruptness of URLLC service data, to improve resource utilization of a communications system, the network device usually does not reserve a resource for downlink data transmission of the URLLC service. When the URLLC service data reaches the network device, and in this case, if there is no idle time-frequency resource, to meet an ultra low latency requirement of the URLLC service, the network device cannot first wait until transmission of eMBB service data scheduled this time is finished and then schedule the URLLC service data. The network device may allocate a resource to the URLLC service data in a preemption manner. Preemption herein indicates that the network device selects some or all of time-frequency resources that have been allocated and that are used to transmit the eMBB service data, to transmit the URLLC service data, and the network device does not send the eMBB service data on the time-frequency resources that are used to transmit the URLLC service data. The communications device does not know that the URLLC service of the network device preempts the time-frequency resources used to transmit the eMBB service data. If the communications device does not know that the resources are preempted, the communications device receives the downlink data on the preempted resources, and consequently a resource waste is caused. Therefore, the network device needs to notify the communications device by using the downlink pre-emption indicator. To avoid the resource waste, it needs to be ensured that the communications device can accurately receive the downlink pre-emption indicator.

Step S602: The communications device determines an active state time of DRX based on the monitoring cycle and a slot index.

The communications device receives the monitoring cycle of the first message sent by the network device, and determines the active state time of the DRX based on the monitoring cycle and the slot index.

In a manner, when the slot index meets the following formula, the communications device determines that a slot corresponding to the slot index is the active state time of the DRX:

$$ns \bmod monitoringPeriodicity = offset,$$

where ns represents the slot index, module represents a modulo operation, monitoringPeriodicity represents the monitoring cycle, the monitoring cycle is in a slot unit, offset is a nonnegative integer, offset is configured by the network device or preset, and when an offset value is configured by the network device, the network device sends the offset value to the communications device. Correspondingly, the communications device receives the offset value sent by the network device. This manner is applicable to the SFI and the downlink preemption indicator. For example, if the monitoring cycle is 20 and offset is 3, the active state time of the DRX is a slot 3, 23, 43, 63, or the like. When the monitoring cycle is 10 and offset is 3, the active state time of the DRX is a slot 3, 13, 23, 33, 43, or the like.

In another manner, when the first message is the SFI, the slot index meets the formula ns module monitoringPeriodicity=offset, and slots in a next monitoring cycle include flexible slots or flexible symbols, the communications device determines that a slot corresponding to the slot index is the active state time of the DRX.

In still another manner, when the first message is the downlink pre-emption indicator message, the slot index meets the formula ns module monitoringPeriodicity=offset, and in a slot corresponding to the slot index, a MAC entity of the communications device has at least one hybrid automatic repeat request HARQ process used for the downlink transmission, the communications device determines that the slot corresponding to the slot index is the active state time of the DRX.

Step S603: The communications device monitors the PDCCH within the active state time of the DRX.

Correspondingly, the network device also determines the active state time of the DRX of the communications device based on the monitoring cycle and the slot index. A manner in which the network device determines the active state time of the DRX of the communications device is the same as a manner in which the communications device determines the active state time of the DRX. Details are not described herein again. The network device sends the first message to the communications device when the DRX of the communications device is in the active state. The communications device monitors the PDCCH within the active state time of the DRX.

Figure 17:
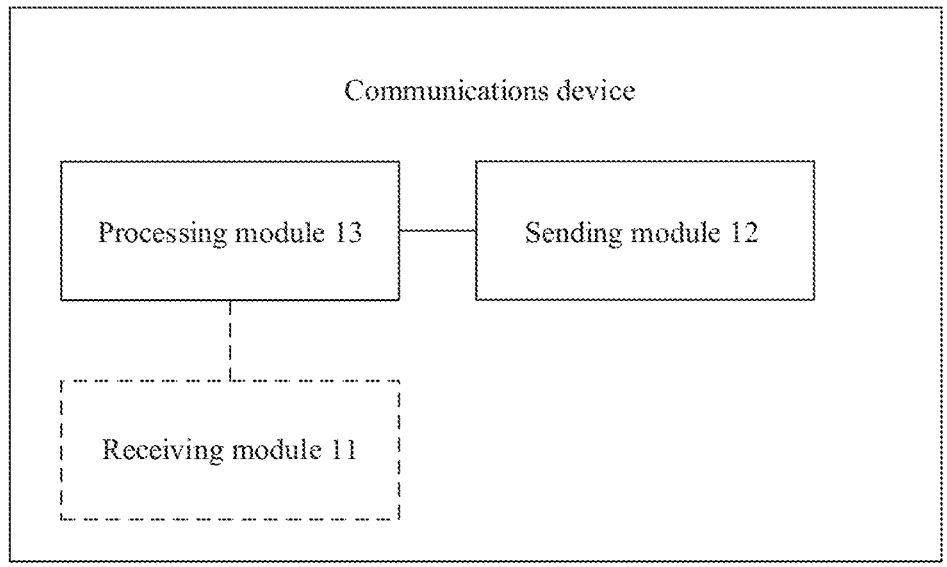
FIG. 17 is a schematic structural diagram of a communications device according to Embodiment 7 of this application.

FIG. 17 is a schematic structural diagram of a communications device according to Embodiment 7 of this application. As shown in FIG. 17, the communications device provided in this embodiment includes:

a receiving module 11, configured to receive configuration information sent by a network device, where the configuration information includes a sending resource of the beam failure recovery request, and the sending resource is a physical uplink control channel (PUCCH) or a media access control control element (MAC CE);

a sending module 12, configured to: when a beam failure occurs in a secondary cell of the communications device, send the beam failure recovery request to the network device by using the PUCCH or the MAC CE; and a processing module 13, configured to determine an active state time of DRX based on a status of the beam failure recovery request.

Optionally, the receiving module 11 is further configured to monitor a physical downlink control channel PDCCH within the active state time of the DRX.

Optionally, the configuration information further includes a value of a response window timer, and the processing module 13 is specifically configured to: after the beam failure recovery request is sent, control the response window timer to start, where a working time of the response window timer is the active state time of the DRX.

Optionally, the configuration information further includes indication information of a first time, the first time is a time for which the communications device delays, after sending the beam failure recovery request, starting the response window timer, and the processing module 13 is specifically configured to: after the beam failure recovery request is sent, control the response window timer to start after a delay of the first time, where the working time of the response window timer is the active state time of the DRX.

Optionally, the receiving module 11 is further configured to receive a first indication; and the processing module 13 is further configured to: when the receiving module 11 receives the first indication, control the response window timer to stop.

Optionally, the first time includes X symbols, and a value of X is greater than 0.

Optionally, when the sending module 12 sends the beam failure recovery request by using the PUCCH, the determining module 12 is specifically configured to: when the beam failure recovery request is suspended, determine that a time in which the beam failure recovery request is in a suspended state is the active state time of the DRX.

The communications device provided in this embodiment may be configured to perform the method performed by the communications device in Embodiment 1. Their specific implementations and technical effects are similar. Details are described herein again.

It may be understood that the sending module and the receiving module in Embodiment 7 may be combined into a transceiver module, which implements similar functions. This is not described herein again.

Figure 18:
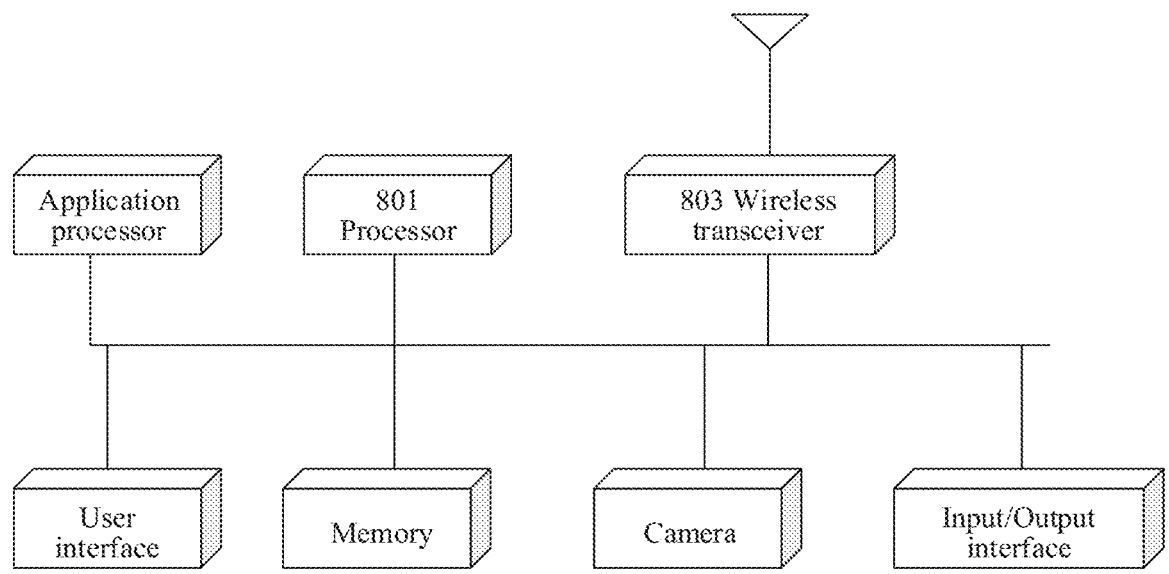
FIG. 18 is a schematic structural diagram of another communications device according to Embodiment 7 of this application.

When the communications device in this embodiment is a terminal, refer to a device shown in FIG. 18. The device includes a processor 801, an application processor, a memory, a user interface, and some other elements (including a device not shown in the figure, for example, a power supply). In FIG. 18, the foregoing processing unit may be the processor 801, and implements a corresponding function. The sending unit and/or the receiving unit may be a wireless transceiver 803 shown in the figure, and the wireless transceiver 803 implements a corresponding function by using an antenna. It may be understood that the elements shown in the figure are merely examples, and are not necessary elements for implementing this embodiment.

Figure 19:
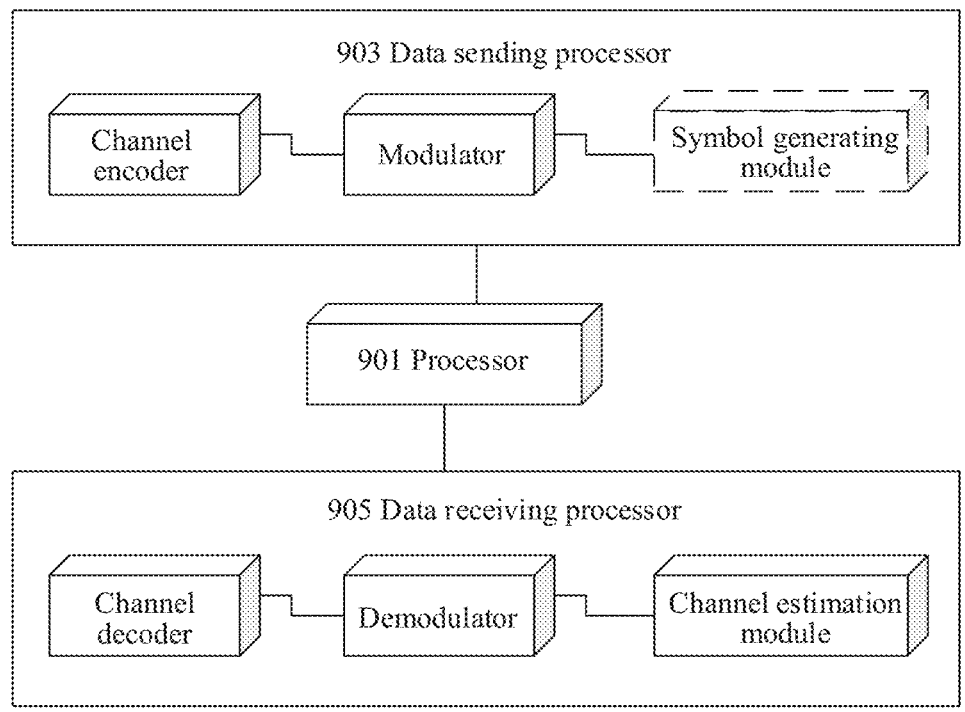
FIG. 19 is a schematic structural diagram of another communications device according to Embodiment 7 of this application.

When the communications device in this embodiment is the terminal, refer to a device shown in FIG. 19. As an example, the device may implement a function similar to that of the processor shown in FIG. 18. In FIG. 19, the device includes a processor, a data sending processor, and a processor. In FIG. 19, the foregoing processing unit may be the processor 901, and implements a corresponding function. The sending unit may be a data sending processor 903 in FIG. 19, and the receiving unit may be a data receiving processor 905 in FIG. 19. Although the figure shows a channel encoder and a channel decoder, it may be understood that the modules are merely examples, and do not constitute a limitation on this embodiment.

Figure 20:
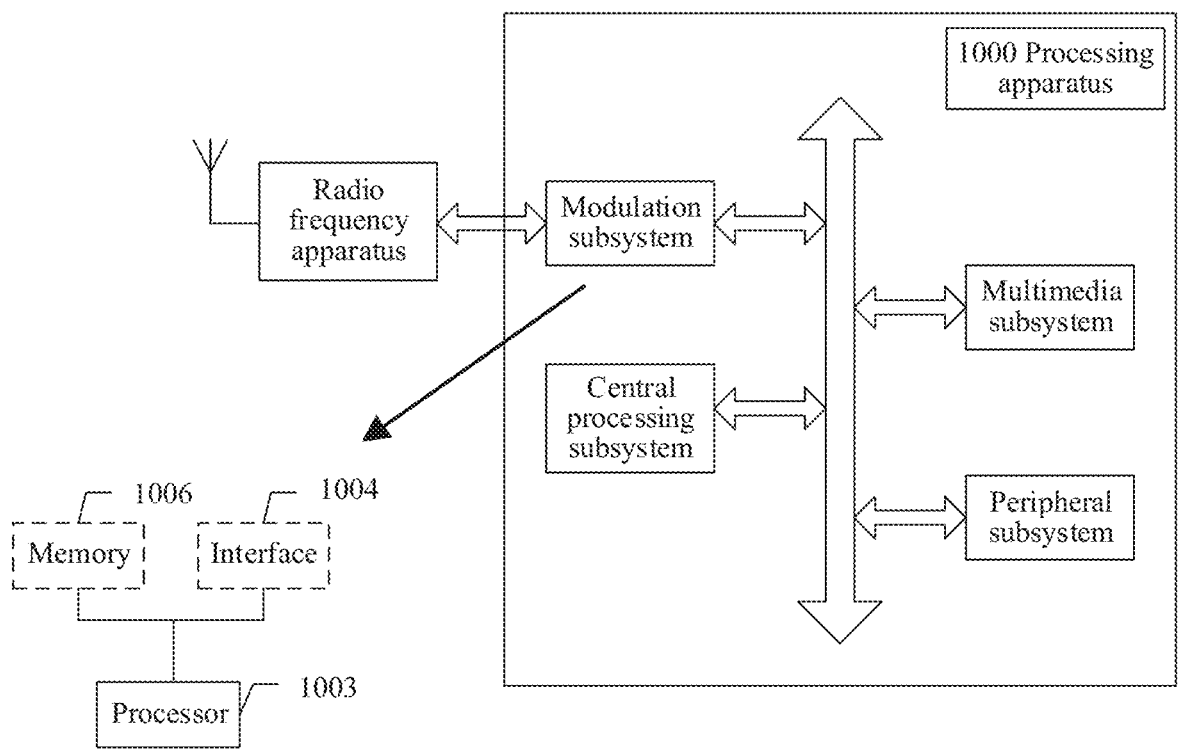
FIG. 20 is a schematic structural diagram of another communications device according to Embodiment 7 of this application.

FIG. 20 shows another form of this embodiment. A processing apparatus 1000 includes modules such as a modulation subsystem, a central processing subsystem, and a peripheral subsystem. The communications device in this embodiment may be used as the modulation subsystem in the processing apparatus 1000. Specifically, the modulation subsystem may include a processor 1003 and an interface 1004. The processor 1003 implements a function of the foregoing processing unit, and the interface 1004 implements a function of the foregoing sending unit and/or receiving unit. As another variation, the modulation subsystem includes a memory 1006, the processor 1003, and a program that is stored in the memory and that may run on the processor, and the processor implements the method in one of Embodiment 1 to Embodiment 5 when executing the program. It should be noted that the memory 1006 may be nonvolatile or volatile, and may be located in the modulation subsystem or the processing apparatus 1000, provided that the memory 1006 may be connected to the processor 1003.

As another form of this embodiment, a computer-readable storage medium is provided, and an instruction is stored in the computer-readable storage medium. When the instruction is executed, the method steps performed by the communications device in Embodiment 1 are performed.

Figure 21:
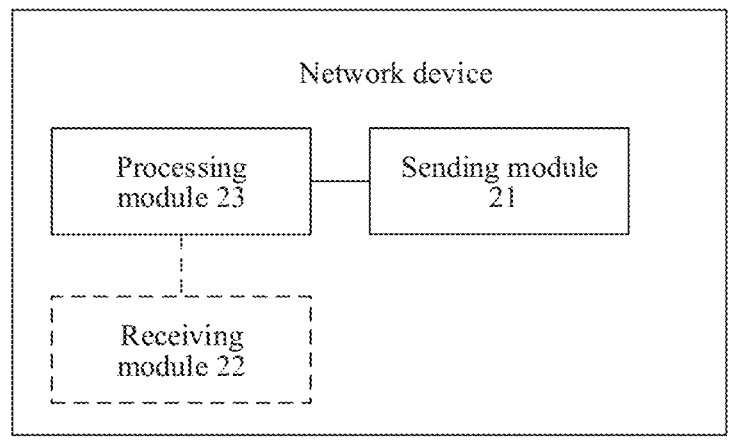
FIG. 21 is a schematic structural diagram of a network device according to Embodiment 8 of this application.

FIG. 21 is a schematic structural diagram of a network device according to Embodiment 8 of this application. As shown in FIG. 21, the network device provided in this embodiment includes:

- a sending module 21, configured to send configuration information to a communications device, where the configuration information includes a sending resource of a beam failure recovery request and a value of a response window timer, and the sending resource is a physical uplink control channel PUCCH or a media access control control element MAC CE;
- a receiving module 22, configured to receive the beam failure recovery request based on the sending resource; and
- a processing module 23, configured to determine an active state time of discontinuous reception DRX of the communications device based on a receiving time of the beam failure recovery request and the value of the response window timer.

Optionally, the configuration information further includes indication information of a first time, and the first time is a time for which the communications device delays, after sending the beam failure recovery request, starting the response window timer.

Optionally, the first time includes X symbols, and a value of X is greater than 0.

It may be understood that the sending module and the receiving module in Embodiment 8 may be combined into a transceiver module, and implement similar functions. This is not described herein again.

The network device provided in this embodiment may be configured to perform the method performed by the network device in Embodiment 1. Their specific implementations and technical effects are similar. Details are described herein again.

Figure 22:
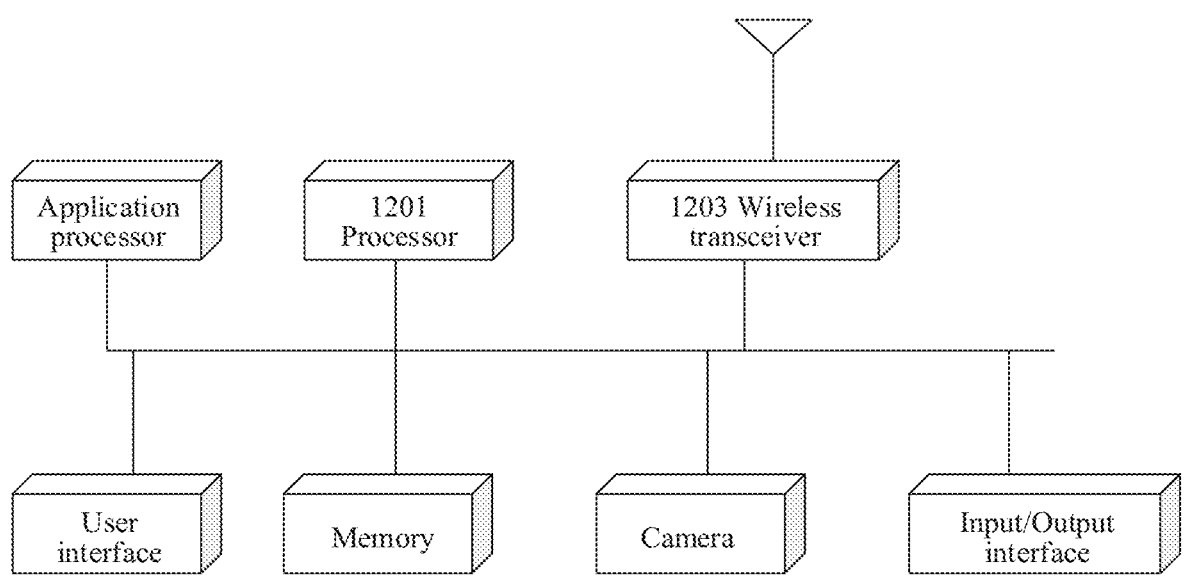
FIG. 22 is a schematic structural diagram of another network device according to Embodiment 8 of this application.

For the network device in this embodiment, refer to a device shown in FIG. 22. The device includes a processor 1201, an application processor, a memory, a user interface, and some other elements (including devices not shown in the figure, for example, a power supply). In FIG. 22, the foregoing processing unit may be the processor 1201, and implements a corresponding function. The sending unit and/or the receiving unit may be a wireless transceiver 1203 shown in the figure, and implement and/or implements a corresponding function by using an antenna. It may be understood that the elements shown in the figure are merely examples, and are not necessary elements for implementing this embodiment.

Figure 23:
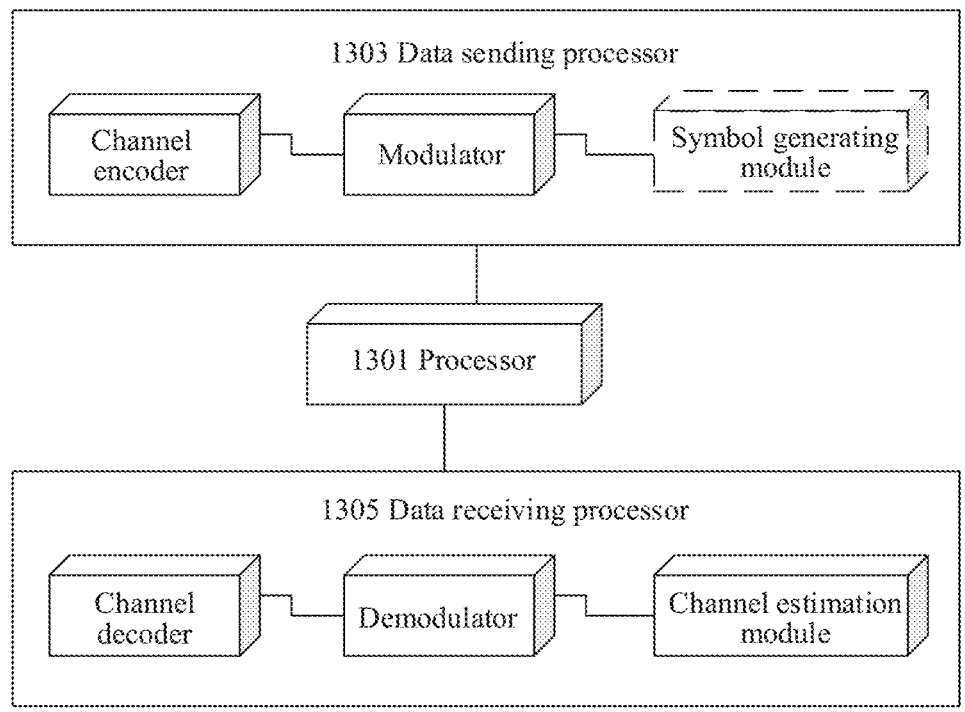
FIG. 23 is a schematic structural diagram of another network device according to Embodiment 8 of this application.

For the network device in this embodiment, refer to a device shown in FIG. 23. In FIG. 23, the device includes a processor, a data sending processor, and a processor. In FIG. 23, the foregoing processing unit may be the processor 1301, and implements a corresponding function. The sending unit may be a data sending processor 1303 in FIG. 23, and the receiving unit may be a data receiving processor 1305 in FIG. 23. Although the figure shows a channel encoder and a channel decoder, it may be understood that the modules are merely examples, and do not constitute a limitation on this embodiment.

Figure 24:
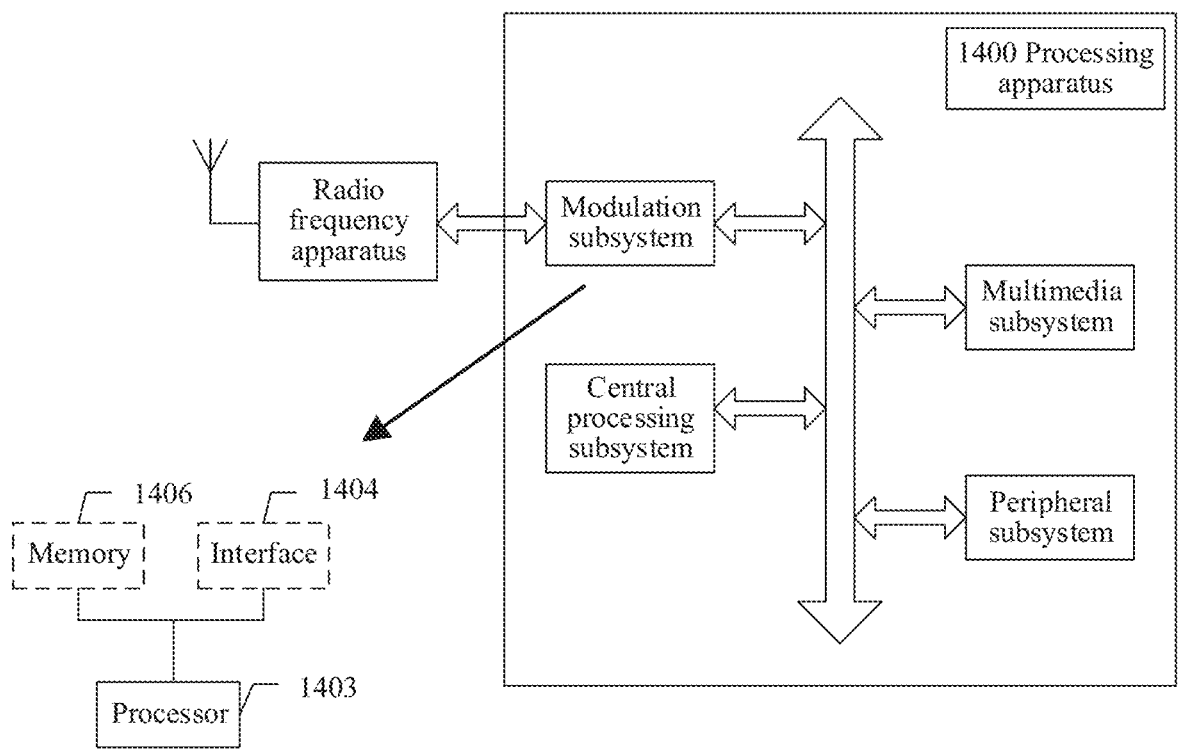
FIG. 24 is a schematic structural diagram of another network device according to Embodiment 8 of this application.

FIG. 24 shows another form of this embodiment. A processing apparatus 1400 includes modules such as a modulation subsystem, a central processing subsystem, and a peripheral subsystem. The communications device in this embodiment may be used as the modulation subsystem in the processing apparatus 1400. Specifically, the modulation subsystem may include a processor 1403 and an interface 1404. The processor 1403 implements a function of the foregoing processing unit, and the interface 1404 implements a function of the foregoing sending unit and/or receiving unit. As another variation, the modulation subsystem includes a memory 1406, the processor 1403, and a program that is stored in the memory and that may run on the processor, and the processor implements the method in one of Embodiment 1 to 4 and Embodiment 6 when executing the program. It should be noted that the memory 1406 may be nonvolatile or volatile, and may be located in the modulation subsystem or the processing apparatus 1400, provided that the memory 1406 may be connected to the processor 1403.

As another form of this embodiment, a computer-readable storage medium is provided, and an instruction is stored in the computer-readable storage medium. When the instruction is executed, the method steps performed by the network device in Embodiment 1 are performed.

Embodiment 9 of this application provides a communications device. The communications device may perform the method steps performed by the communications device in Embodiment 2 to Embodiment 6. The communications device may be a terminal, or may be hardware implementing a similar function.

The communications device includes at least one processor. The processor is coupled to a memory. The processor is configured to read an instruction in the memory, and perform, based on the instruction, the method steps performed by the communications device in Embodiment 2 to Embodiment 6.

Embodiment 10 of this application provides a network device. The network device may perform the method steps performed by the network device in Embodiment 2 to Embodiment 6.

The network device includes at least one processor. The processor is coupled to a memory. The processor is configured to read an instruction in the memory, and perform, based on the instruction, the method steps performed by the network device in Embodiment 2 to Embodiment 6.

Embodiment 11 of this application provides a computer-readable storage medium. The computer-readable storage medium stores an instruction, and when the instruction is executed, the method steps performed by the communications device in Embodiment 2 to Embodiment 6 are performed.

Embodiment 12 of this application provides a computer-readable storage medium. The computer-readable storage medium stores an instruction, and when the instruction is executed, the method steps performed by the network device in Embodiment 2 to Embodiment 6 are performed.

It should be noted that, in foregoing Embodiment 9 and Embodiment 10, the memory may be integrated into the processor, or may be independent of the processor. This is not limited in this embodiment.

The processor in the embodiments may be a general purpose processor, a digital signal processor (DSP), an application specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory 1002, and a processor 1001 reads instructions in the memory 1002 and completes the steps in the foregoing methods in combination with hardware of the processor.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or a part of the technical solutions may be implemented in the form of a software product. The computer software product is stored in a storage medium and includes several instructions for instructing a computer device (which may be a personal computer, a server, or a network device) or a processor to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a communications device, configuration information sent by a network device, wherein the configuration information comprises a sending resource of a beam failure recovery request, and the sending resource is a physical uplink control channel (PUCCH) or a media access control control element (MAC CE);
when a beam failure occurs in a secondary cell of the communications device, sending, by the communications device, the beam failure recovery request to the network device using the PUCCH or the MAC CE; and
determining, by the communications device, an active state time of discontinuous reception (DRX) based on a status of the beam failure recovery request, the active state time of the DRX being a time duration starting after a first time after the beam failure recovery request is sent; and
wherein when the communications device sends the beam failure recovery request using the PUCCH, determining, by the communications device, the active state time of DRX based on the status of the beam failure recovery request comprises:
when the beam failure recovery request is suspended, determining, by the communications device, that a time duration in which the beam failure recovery request is in a suspended state is the active state time of the DRX.

2. The method according to claim 1, further comprising:
monitoring, by the communications device, a physical downlink control channel (PDCCH) within the active state time of the DRX.

3. The method according to claim 1, wherein the configuration information further comprises a value of a response window timer, and determining, by the communications device, the active state time of the DRX based on the status of the beam failure recovery request comprises:
after the beam failure recovery request is sent, controlling, by the communications device, to start the response window timer, wherein a working time duration of the response window timer is the active state time of the DRX.

4. The method according to claim 3, wherein the configuration information further comprises indication information of the first time, the first time is a time for which the communications device delays, and wherein determining, by the communications device, the active state time of DRX based on the status of the beam failure recovery request further comprises:
after the beam failure recovery request is sent, controlling, by the communications device, to start the response window timer after a delay of the first time, wherein the working time duration of the response window timer is the active state time of the DRX.

5. The method according to claim 4, wherein the first time comprises X symbols, and a value of X is greater than 0.

6. The method according to claim 3, further comprising:
when receiving a first indication, controlling, by the communications device, to stop the response window timer.

7. A communication method, comprising:
receiving, by a communications device, configuration information of a configured grant timer and configuration information of an uplink retransmission timer that are sent by a network device;
determining, by the communications device, a stopping time of the uplink retransmission timer based on a running status of the configured grant timer, wherein discontinuous reception (DRX) of the communications device is in an active state when the uplink retransmission timer is running; and
monitoring, by the communications device, a physical downlink control channel (PDCCH) when the DRX of the communications device is in the active state.

8. The method according to claim 7, wherein determining, by the communications device, the stopping time of the uplink retransmission timer based on the running status of the configured grant timer comprises:
when the configured grant timer expires, and when the uplink retransmission timer is running, controlling, by the communications device, to stop the uplink retransmission timer.

9. The method according to claim 7, wherein the configured grant timer is started by the communications device after a first sending of first data.

10. The method according to claim 7, wherein the configured grant timer is started by the communications device when first data is sent.

11. The method according to claim 7, wherein the configured grant timer is started by the communications device after an uplink round trip time timer expires.

12. A communications device, comprising:
a non-transitory memory storage comprising instructions; and
one or more processors in communication with the memory storage, wherein the instructions, when executed by the one or more processors, cause the communications device to:
receive configuration information sent by a network device, wherein the configuration information comprises a sending resource of a beam failure recovery request, and the sending resource is a physical uplink control channel (PUCCH) or a media access control control element (MAC CE);
when a beam failure occurs in a secondary cell of the communications device, send the beam failure recovery request to the network device using the PUCCH or the MAC CE; and
determine an active state time of DRX based on a status of the beam failure recovery request, the active state time of the DRX being a time duration starting after a first time after the beam failure recovery request is sent; and
wherein the instructions cause the communications device further to:
when sending the beam failure recovery request using the PUCCH, and when the beam failure recovery request is suspended, determine that a time duration in which the beam failure recovery request is in a suspended state is the active state time of the DRX.

13. The communications device according to claim 12, wherein the instructions cause the communications device further to:
monitor a physical downlink control channel (PDCCH) within the active state time of the DRX.

14. The communications device according to claim 12, wherein the configuration information comprises a value of a response window timer, and the instructions cause the communications device further to:

after the beam failure recovery request is sent, control to start the response window timer, wherein a working time duration of the response window timer is the active state time of the DRX.

15. The communications device according to claim 14, wherein the configuration information comprises indication information of the first time, the first time is a time for which the communications device delays, and the instructions cause the communications device further to:
after the beam failure recovery request is sent, control to start the response window timer after a delay of the first time, wherein the working time duration of the response window timer is the active state time of the DRX.

16. The communications device according to claim 15, wherein the first time comprises X symbols, and a value of X is greater than 0.

17. The communications device according to claim 14, wherein the instructions cause the communications device further to:
receive a first indication; and
when receiving the first indication, control to stop the response window timer.

* * * * *